(12) United States Patent
Beck

(10) Patent No.: US 12,528,349 B2
(45) Date of Patent: Jan. 20, 2026

(54) AXLE GEAR SYSTEM FOR A MOTOR VEHICLE DRIVE AXLE

(71) Applicant: ZF Friedrichshafen AG, Friedrichshafen (DE)

(72) Inventor: Stefan Beck, Pirminstraße 7 (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/845,208

(22) PCT Filed: Feb. 6, 2023

(86) PCT No.: PCT/EP2023/052776
§ 371 (c)(1),
(2) Date: Sep. 9, 2024

(87) PCT Pub. No.: WO2023/169750
PCT Pub. Date: Sep. 14, 2023

(65) Prior Publication Data
US 2025/0187431 A1    Jun. 12, 2025

(30) Foreign Application Priority Data
Mar. 10, 2022    (DE) .......................... 102022202383.8

(51) Int. Cl.
*B60K 17/04*    (2006.01)
*B60K 1/00*     (2006.01)
(Continued)

(52) U.S. Cl.
CPC ............ *B60K 17/046* (2013.01); *B60K 17/04* (2013.01); *B60K 17/16* (2013.01); *B60K 7/0007* (2013.01); *F16H 48/10* (2013.01)

(58) Field of Classification Search
CPC ...... B60K 17/046; B60K 17/04; B60K 17/16; B60K 7/0007; F16H 48/10;
(Continued)

(56) References Cited

U.S. PATENT DOCUMENTS 2,737,829 A * 3/1956 Wilson ................. B60K 17/046
475/221
4,245,524 A * 1/1981 Dammon ................ F16H 48/10
180/6.7
(Continued)

FOREIGN PATENT DOCUMENTS

DE    102011102749 A1    11/2012
DE    102012101209 A1     8/2013
(Continued)

OTHER PUBLICATIONS

German Search Report for Application No. 102022202383.8 dated Apr. 10, 2024.
(Continued)

*Primary Examiner* — Tinh Dang
(74) *Attorney, Agent, or Firm* — Dority & Manning, P.A.

(57) ABSTRACT

An axle gear system (8) includes a planetary stage (14), a first driven shaft (13) and a second driven shaft (11). The planetary stage (14) has a fixed carrier train ratio of less than negative one (−1). A sun gear (19) of the planetary stage (14) is connected to a drive shaft (9) for conjoint rotation. A planet carrier (20) is connected to a first output shaft (12) for conjoint rotation. The first output shaft (12) is coupled to the first driven shaft (13) via a first intermediate transmission (16). A ring gear (21) is connected to a second output shaft (10) for conjoint rotation. The second output shaft (10) is coupled to the second driven shaft (11) via a second intermediate transmission (15). Transmission ratios of the first and second intermediate transmissions (15, 16) are coordinated such that, in combination with the fixed carrier train (Continued)

ratio of the planetary stage (14), a symmetrical torque distribution from the drive shaft (9) onto the driven shafts (11, 13) is established.

20 Claims, 11 Drawing Sheets

(51) Int. Cl.
*B60K 7/00* (2006.01)
*B60K 17/16* (2006.01)
*F16H 48/10* (2012.01)

(58) Field of Classification Search
CPC ......... F16H 2048/102; F16H 2048/104; F16H 2048/106; F16H 2048/11
See application file for complete search history.

(56) References Cited

U.S. PATENT DOCUMENTS

| | | | |
|---|---|---|---|
| 5,919,109 | A | 7/1999 | Fleckenstein |
| 8,795,121 | B2 | 8/2014 | Klomp |
| 9,657,825 | B2 | 5/2017 | Ohmura et al. |
| 2004/0220011 | A1* | 11/2004 | Gumpoltsberger ..... F16H 48/36 475/205 |

FOREIGN PATENT DOCUMENTS

| | | |
|---|---|---|
| DE | 102018111796 A1 | 11/2019 |
| DE | 102019125156 A1 | 3/2021 |

OTHER PUBLICATIONS

International Search Report for Application No. PCT/EP2023/052776 dated Apr. 28, 2023.

* cited by examiner

AXLE GEAR SYSTEM FOR A MOTOR VEHICLE DRIVE AXLE

CROSS-REFERENCE TO RELATED APPLICATIONS

The present application is related and has right of priority to German Patent Application No. DE 102022202383.8 filed on Mar. 10, 2022, and is a U.S. national phase of PCT/EP2023/052776 filed on Feb. 6, 2023, both of which are incorporated by reference in their entireties for all purposes.

TECHNICAL FIELD

The invention relates generally to an axle gear system for a motor vehicle drive axle, in particular for an electric axle drive. The invention also relates generally to a motor vehicle drive axle and to an electric axle drive.

BACKGROUND

Motor vehicle drive axles usually have, as an axle gear, a differential, via which a symmetrical transverse distribution of an input torque onto driving wheels of the motor vehicle drive axle is carried out and, at the same time, differential speeds between the driving wheels are allowed when the motor vehicle is negotiating a curve. Such a differential is frequently in the form of a bevel gear differential. In many motor vehicle drive axles, such as, for example, portal axles, even more gear stages can be connected downstream from the axle gear.

DE 10 2012 101 209 A1 describes an axle gear system which has, in addition to a drive shaft and two driven shafts, one planetary stage and two spur gear stages. Driving wheels of a motor vehicle drive axle are connected to the driven shafts for conjoint rotation, while a coupling to a drive of the motor vehicle drive axle is established at the drive shaft, the drive of the motor vehicle drive axle being formed by two electric machines. The planetary stage is composed of a sun gear, a ring gear and a planet carrier in which multiple planet gears are rotatably mounted. Each of the planet gears is meshed with both the sun gear and the ring gear. While the ring gear of the planetary stage is connected to the drive shaft for conjoint rotation, both the planet carrier and the sun gear are connected to one spur gear each of the respective downstream spur gear stage for conjoint rotation. Via one spur gear stage, a coupling to one driven shaft is established and, via the other spur gear stage, a coupling to the other driven shaft is established.

BRIEF SUMMARY

Proceeding from the above-described background, example aspects of the present invention provide an axle gear system that is radially compact and by which a symmetrical torque distribution can be achieved simultaneously with the highest possible transmission ratio.

According to example aspects of the invention, an axle gear system has a planetary stage, a first driven shaft and a second driven shaft, which are provided for connections to driving wheels of the motor vehicle drive axle, and a drive shaft which is provided for coupling to a drive. The planetary stage has a sun gear, a ring gear and a planet carrier in which at least one planet gear is rotatably mounted. The at least one planet gear is meshed with both the sun gear and the ring gear.

In the axle gear system according to example aspects of the invention, therefore, a drive shaft as well as a first driven shaft and a second driven shaft are provided. A "shaft" as set forth in the invention is understood to be a rotatable component of the axle gear system, via which a power path can be established between components which are directly attached to the shaft. The shaft can connect these components to each other axially or radially or even both axially and radially. Therefore, the shaft can also be present as an intermediate piece via which only one radial connection is achieved.

The drive shaft in the axle gear system is provided for connection to a drive. Therefore, when the axle gear system is installed, a drive motion is introduced at the drive shaft during operation. The two driven shafts are provided for connections to driving wheels of the motor vehicle drive axle. When the axle gear system is installed, the individual driven shaft is preferably connected at a mounting interface, which is in the form, in particular, of a shaft end, to an associated wheel hub for conjoint rotation, on which wheel hub the driving wheel can be mounted in a rotationally fixed manner. Therefore, when the axle gear system is installed, a connection is established via the first driven shaft to a first drive side and to the driving wheel located there, while a connection is established via the second driven shaft to a second drive side and thus to the driving wheel which is connected there.

The two driven shafts are, in particular, coaxial and preferably define a wheel axis on which rotation axes of the driving wheels of the motor vehicle drive axle then also lie. It is further preferred when the drive shaft is positioned at an axial offset to the two driven shafts and defines, in particular, a drive axle at which a drive motion is introduced during operation, the drive motion being transmitted further within the axle gear system and distributed to the two driven shafts.

The term "axial" as set forth in the invention is understood to be an orientation towards a rotation axis of a rotatable component of the axle gear system. The term "radial" is then understood to be an orientation in the diameter direction of the component.

The axle gear system according to example aspects of the invention also has a planetary stage which is composed of a sun gear, a ring gear and a planet carrier. In the planet carrier, at least one planet gear is rotatably mounted, the at least one planet gear being meshed with both the radially inwardly located sun gear and the radially surrounding ring gear. It is particularly preferred, however, when multiple planet gears are rotatably mounted in the planet carrier, the planet gears each meshing with both the sun gear and the ring gear. The planetary stage of the axle gear system according to the invention is therefore designed as a negative planetary stage.

The invention now encompasses the technical teaching that the planetary stage has a fixed carrier train ratio of less than negative one (−1). Furthermore, the sun gear of the planetary stage is connected to the drive shaft for conjoint rotation, whereas the planet carrier is connected to a first output shaft for conjoint rotation, the first output shaft being coupled to the first driven shaft via a first intermediate transmission, and the ring gear is connected to a second output shaft for conjoint rotation, the second output shaft being coupled to the second driven shaft via a second intermediate transmission. The transmission ratios of the intermediate transmissions are coordinated such that, in combination with the fixed carrier train ratio of the planetary stage, a symmetrical torque distribution from the drive shaft onto the driven shafts is established.

In other words, a fixed carrier train ratio of the planetary stage of less than negative one (−1) is selected. The planetary stage is incorporated with respect to the two driven shafts and the drive shaft such that the drive shaft has a corotational connection with the sun gear of the planetary stage, while the planet carrier is connected to a first output shaft for conjoint rotation and the ring gear is connected to a second output shaft for conjoint rotation. The first output shaft is permanently coupled to the first driven shaft via a first intermediate transmission, whereas a coupling between the second output shaft and the second driven shaft is implemented via a second intermediate transmission. A transmission ratio of the first intermediate transmission and a transmission ratio of the second intermediate transmission are selected in relation to each other such that, together with the fixed carrier train ratio of the planetary stage, torques from the drive shaft are evenly distributed onto the two driven shafts.

Such an example embodiment of an axle gear system has the advantage that a high transmission ratio of a drive motion introduced at the drive shaft to the driven shafts can be achieved in combination with a radially compact configuration. An asymmetrical distribution onto the two output shafts initially takes place via the planetary stage due to the fixed carrier train ratio of the planetary stage of less than negative one (−1). Proceeding from the respective output shaft, a further transmission ratio onto the respective driven shaft is subsequently implemented via the respective further intermediate transmission. As a result, proceeding from the drive shaft, a high transmission ratio toward the driven shaft can be easily achieved, which makes the axle gear system according to example aspects of the invention suitable, in particular, for the application in an electric axle drive in combination with at least one electric machine.

Due to the fact that the transmission ratios of the intermediate transmissions are coordinated, subsequent to the initially asymmetrical distribution overall carried out by the planetary stage, a symmetrical torque distribution onto the driven shafts is established. In addition, an identical direction of rotation of the driven shafts is achieved due to the fact that the transmission ratios of the intermediate transmissions are coordinated. This is the case because, due to the fixed carrier train ratio of less than negative one (−1), the output shafts have, in addition to the asymmetrical torque distribution, opposing directions of rotation, which is compensated by the downstream intermediate transmissions due to the coordinated transmission ratios selected there, while a symmetrical torque distribution and identical directions of rotation are established. Finally, the combination of the planetary stage with the downstream intermediate transmissions allows for a radially compact configuration overall, which makes the axle gear system according to example aspects of the invention suitable for the application in a motor vehicle drive axle under tight installation space conditions.

As set forth in the invention, the "fixed carrier train ratio" of the planetary stage is understood to be the transmission ratio that acts between the sun gear and the ring gear when the planet carrier is held fixed. According to the invention, this fixed carrier train ratio in the planetary stage is less than negative one (−1). Due to the negative fixed carrier train ratio, the introduction of a drive motion at the sun of the planetary stage via the drive shaft results in opposing directions of rotation of the output shafts which are connected to the planet carrier and to the ring gear. In addition, due to the fixed carrier train ratio deviating from negative one (−1), an asymmetrical torque distribution onto the output shafts is established.

The intermediate transmissions, each of which follows the planetary stage in the direction of power flow, subsequent to a distribution via the planetary stage onto the respective output shaft, to the respective driven shaft, are mechanisms, via each of which a further transmission ratio, i.e., a rotational speed-torque conversion, from the respective output shaft onto the respective driven shaft is implemented. The respective intermediate transmission has a transmission ratio, by which the ratio of the rotational speeds of the respective output shaft and the respective driven shaft are defined with respect to each other and the ratio of the torques of the respective output shaft and the respective driven shaft are defined with respect to each other.

In the axle gear system according to example aspects of the invention, the transmission ratios of the intermediate transmissions are selected to differ from one another and are coordinated with respect to their deviation such that the asymmetrical distribution that is initially established via the planetary stage is compensated. Due to the combination of differing transmission ratios of the intermediate transmissions with the fixed carrier train ratio of the planetary stage, which is selected to be less than negative one (−1), a symmetrical torque distribution from the drive shaft onto the driven shafts is achieved overall in combination with a high transmission ratio and identical directions of rotation of the driven shafts. As set forth in the invention, a "symmetrical torque distribution" is to be understood as an approximately even distribution, wherein deviations from a torque distribution which is exactly even, i.e., in exactly two halves, lie within the scope of a deviation which is usual for a transverse differential.

According to one example embodiment of the invention, identical directions of rotation of the respective output shaft and of the respective driven shaft are brought about via one intermediate transmission, while the other intermediate transmission generates opposing directions of rotation of the respective output shaft and of the respective driven shaft. As a result, the opposing directions of rotation of the output shafts that take place upstream from the intermediate transmissions can be easily converted into identical directions of rotation of the driven shafts. This can be achieved, in particular, due to the fact that one more tooth engagement is implemented with one intermediate transmission than with the other intermediate transmission.

In one example development of the aforementioned example embodiment, the one intermediate transmission is formed by a first spur gear stage having two intermeshed spur gears, one spur gear being non-rotatably positioned on the output shaft associated with the one intermediate transmission and the other spur gear being positioned on the driven shaft associated with the one intermediate transmission. The other intermediate transmission is formed by a second spur gear stage in which two spur gears each mesh with an intermediate gear. In the second spur gear stage, one spur gear is non-rotatably positioned on the output shaft associated with the other intermediate transmission and the other spur gear is non-rotatably positioned on the driven shaft associated with the other intermediate transmission. Both intermediate transmissions are therefore formed by spur gear stages in this case. In the other intermediate transmission, the additional tooth engagement is achieved within the second spur gear stage by coupling the two spur gears via the intermediate gear situated therebetween. As a result, the identical orientation of the directions of rotation of the driven shafts can be easily achieved. Advantageously, in addition, suitable transmission ratios can be easily achieved via the spur gear stages in order to implement the overall symmetrical torque distribution in combination with a high transmission ratio.

Alternatively, the one intermediate transmission is formed by a first spur gear stage having two intermeshed spur gears, one spur gear being non-rotatably positioned on the output shaft associated with the one intermediate transmission and the other spur gear being non-rotatably positioned on the driven shaft associated with the one intermediate transmission. In contrast, the other intermediate transmission is formed by a flexible traction drive mechanism in which a traction mechanism couples two traction pulleys to each other, one traction pulley being non-rotatably positioned on the output shaft associated with the other intermediate transmission and the other traction pulley being non-rotatably positioned on the driven shaft associated with the other intermediate transmission. In this example variant, the one intermediate transmission is therefore formed by a spur gear stage and the other intermediate transmission is formed by a flexible traction drive mechanism. In this case, the one additional tooth engagement in comparison to the flexible traction drive mechanism within the spur gear stage for achieving the identical orientation of the directions of rotation of the driven shafts is brought about via the one intermediate transmission. Furthermore, the spur gear stage and the flexible traction drive mechanism can be coordinated with respect to their transmission ratios such that, overall, the symmetrical torque distribution results in combination with a high transmission ratio.

According to one example design option of example aspects of the invention, the planetary stage is axially equidistant to mounting interfaces of the driven shafts for the driving wheels or is axially offset towards one of the mounting interfaces. In the former case, the planetary stage is therefore positioned essentially axially symmetrically between mounting interfaces, at each of which a connection of the respective driven shaft to the respective driving wheel is established when the axle gear system is installed. The mounting interface is, in particular, a wheel hub. Alternatively, the planetary stage can also be axially offset towards one of the mounting interfaces. As a result, the axle gear system can be adapted to a positioning of the drive, or also to vehicle body conditions.

In another example embodiment of example aspects of the invention, the drive shaft is offset to a wheel axis, which is formed by the coaxial driven shafts, upwards or downwards in a vertical direction. As a result, the axle gear system according to example aspects of the invention can be designed for the application in a motor vehicle drive axle in the form of a portal axle, in which the input-side introduction of a drive motion is upwardly or downwardly offset to the wheel axis. In the former case, a higher ground clearance can be achieved with the motor vehicle drive axle, while in the latter case, a vehicle body of the motor vehicle can be positioned at a lower level. Otherwise, the drive shaft and the wheel axis could also optionally be coaxial.

Alternatively or in addition to the aforementioned example embodiment, the drive shaft is offset to a wheel axis, which is formed by the coaxial driven shafts, toward the front or toward the rear in a direction of travel. In the former example variant, the drive shaft is therefore offset to the wheel axis in the direction of travel, i.e., in the longitudinal direction of the motor vehicle, toward a front side of the motor vehicle, while the drive shaft in the latter example variant is offset to the wheel axis toward a rear side of the motor vehicle. Alternatively, the drive shaft could also lie at the level of the wheel axis in the direction of travel, i.e., in the longitudinal direction of the motor vehicle.

According to one example design option of example aspects of the invention, the drive shaft is coupled via at least one gear stage to a connection shaft which is designed for connection to the drive. Advantageously, as a result, a pre-ratio can be achieved when a drive motion is introduced into the planetary stage. The drive shaft can be coupled to the connection shaft via one or more gear stage(s).

In one example development of the aforementioned example embodiment, the at least one gear stage includes a bevel gear stage in which a first bevel gear and a second bevel gear are meshed, the first bevel gear being coupled to the drive shaft and the second bevel gear being coupled to the connection shaft. As a result, a drive motion can be introduced into the drive shaft from the connection shaft, which lies at an angle to the drive shaft. It is particularly preferred when the first bevel gear is non-rotatably mounted on the drive shaft and the second bevel gear is non-rotatably mounted on the connection shaft.

Alternatively or additionally, the at least one gear stage includes a spur gear stage in which a first spur gear and a second spur gear are intermeshed, the first spur gear being coupled to the drive shaft and the second spur gear being coupled to the connection shaft. As a result, the coupling of the input shaft to a connection shaft, which is axially offset thereto, can be implemented. In particular, the first spur gear is non-rotatably positioned on the drive shaft and the second spur gear is non-rotatably positioned on the connection shaft. If multiple gear stages are present, however, one of the two spur gears is coupled to the respective shaft.

In an example development of example aspects of the invention, the planetary stage is arranged axially between the intermediate transmissions. Alternatively, the intermediate transmissions are positioned axially directly next to each other. In both cases, the planetary stage and the intermediate transmissions can lie axially close to one another or can be axially spaced apart.

Example aspects of the invention also relate to a motor vehicle drive axle which has an axle gear system of one or more of the aforementioned example variants. Furthermore, at least one driving wheel each is then connected to the first driven shaft and to the second driven shaft.

An aforementioned motor vehicle drive axle is, in particular, part of an electric axle drive in which at least one electric machine is then additionally provided, the respective rotor of which is coupled to the drive shaft of the axle gear system. The at least one electric machine can be positioned coaxially with the drive shaft of the axle gear system. However, the at least one electric machine can also be axially offset to the drive shaft of the axle gear system. If multiple electric machines are provided, one electric machine can also be positioned coaxially and the other electric machine can be axially offset.

The invention is not limited to the specified combination of features of the main claim or of the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous example embodiments of the invention, which are explained in the following, are shown in the drawings in which.

DETAILED DESCRIPTION

Figures 1, 2:
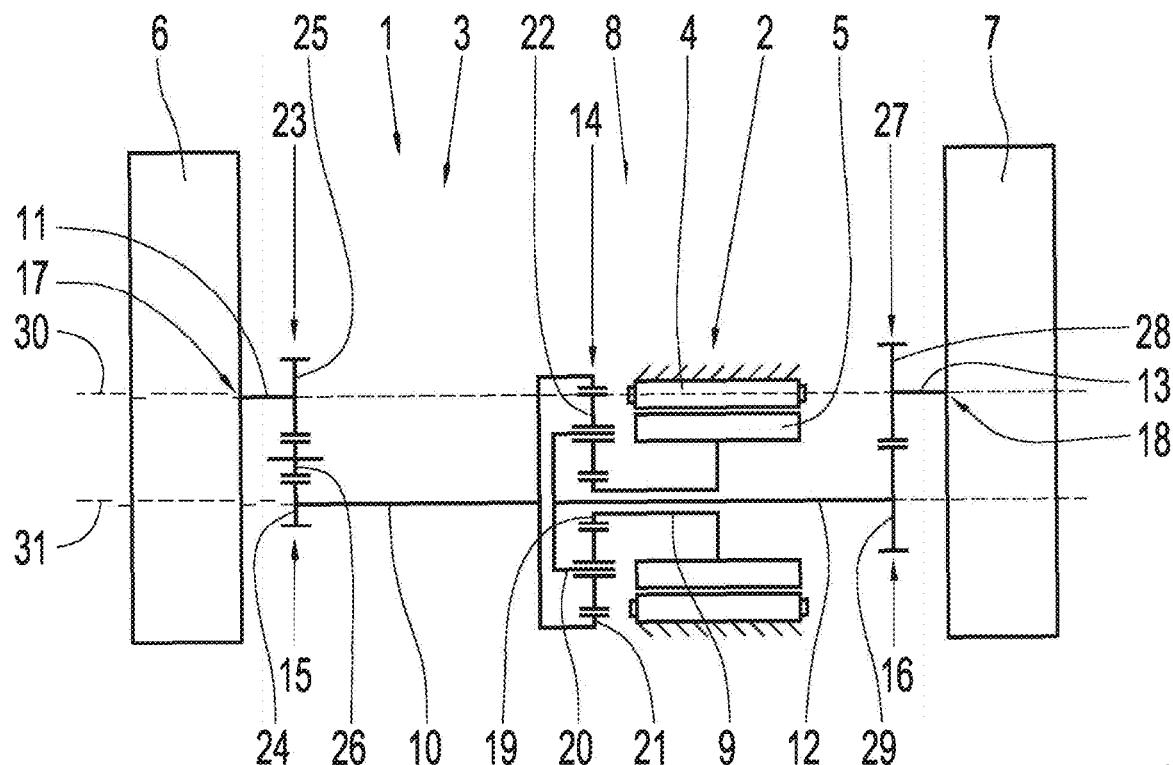
FIG. 1 shows a schematic view of an electric axle drive having a motor vehicle drive axle according to a first example embodiment of the invention.
FIG. 2 shows a schematic view of an electric axle drive having a motor vehicle drive axle according to a second example design option of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of an electric axle drive 1 designed according to example aspects of the invention, which can preferably be used as a drive axle of an electric vehicle. This electric axle drive 1 has an electric machine 2 and a motor vehicle drive axle 3, which is designed according to a first example embodiment of the invention. The electric machine 2 forms a drive of the electric axle drive 1 and includes a stator 4 and a rotor 5. The electric machine 2 can be operated as an electric motor in order to drive the driving wheels 6 and 7 of the motor vehicle drive axle 3 and operated as a generator in order to decelerate the driving wheels 6 and 7.

In addition to the driving wheels 6 and 7, the motor vehicle drive axle 3 also has an axle gear system 8 which is designed according to a first example design option of the invention. The axle gear system 8 includes, in addition to a drive shaft 9, an output shaft 10, a driven shaft 11, an output shaft 12 and a driven shaft 13, a planetary stage 14 as well as two intermediate transmissions 15 and 16. While the drive shaft 9 is connected to the rotor 5 of the electric machine 2 for conjoint rotation, the driven shafts 11 and 13 form mounting interfaces 17 and 18 at shaft ends, the driving wheels 6 and 7 being mounted at the mounting interfaces 17 and 18, respectively, in a rotationally fixed manner. Preferably, the mounting interfaces 17 and 18 are each in the form of a wheel hub (not shown in greater detail).

Within the motor vehicle drive axle 3 according to example aspects of the invention, the axle gear system 8 is used to symmetrically distribute an input torque introduced at the drive shaft 9 via the electric machine 2 onto the two driven shafts 11 and 13 and, due to a speed reducing ratio, generate higher output torques at the driven shafts 11 and 13, and thus also at the driving wheels 6 and 7. As a result, a high-speed machine can be used as the electric machine 2.

Distribution is carried out via the planetary stage 14, which is composed of a sun gear 19, a planet carrier 20 and a ring gear 21. In the planet carrier 20, multiple planet gears 22 are rotatably mounted, each of which is meshed with both the radially inwardly located sun gear 19 and the radially surrounding ring gear 21. The planetary stage 14 is therefore in the form of a negative planetary stage in the present case. The sun gear 19 is permanently connected to the drive shaft 9 for conjoint rotation, while the planet carrier 20 is connected to the output shaft 12 for conjoint rotation and the ring gear 21 is connected to the output shaft 10 for conjoint rotation.

In the present case, the planetary stage 14 has a fixed carrier train ratio of less than negative one (−1), which results in an asymmetrical distribution, i.e., a different transmission ratio, of the input torque introduced at the drive shaft 9 onto the output shafts 10 and 12. Due as well to the fixed carrier train ratio of less than negative one (−1), the output shafts 10 and 12 have different directions of rotation. In order to finally achieve a symmetrical distribution onto the two driven shafts 11 and 13, and to achieve a further, additional speed reducing ratio in each case, the intermediate transmissions 15 and 16 are provided between the output shafts 10 and 12, respectively, and the associated driven shafts 11 and 13, respectively.

As is apparent in FIG. 1, the intermediate transmission 15 is formed by a spur gear stage 23, which is composed of two spur gears 24 and 25 as well as an intermediate gear 26. The spur gear 24 is non-rotatably positioned on the output shaft 10 and is meshed with the intermediate gear 26, which also meshes with the spur gear 25 at the same time. The spur gear 25 is non-rotatably positioned on the driven shaft 11. Therefore, the spur gear stage 23 permanently couples the output shaft 10 and the driven shaft 11 to each other.

The intermediate transmission 16 is also formed by a spur gear stage 27, which is composed of two spur gears 28 and 29. The spur gears 28 and 29 are permanently intermeshed, the spur gear 28 being mounted on the driven shaft 13 in a rotationally fixed manner and the spur gear 29 being mounted on the output shaft 12 in a rotationally fixed manner. Therefore, the output shaft 12 and the driven shaft 13 are permanently coupled to each other via the spur gear stage 27.

As a distinguishing feature, a transmission ratio defined by the spur gear stage 23 and a transmission ratio defined by the spur gear stage 27 are coordinated such that the asymmetrical distribution by the planetary stage 14 from the drive shaft 9 onto the output shafts 10 and 12 is compensated, resulting in an overall symmetrical distribution onto the driven shafts 11 and 13. The transmission ratios of the spur gear stages 23 and 27 are selected such that an overall gear ratio that acts between the drive shaft 9 and the driven shaft 11 corresponds to an overall gear ratio that acts between the drive shaft 9 and the driven shaft 13. Due to the additional tooth engagement in the spur gear stage 23 in comparison to the spur gear stage 27, identical directions of rotation of the driven shafts 11 and 13 are additionally brought about.

In the axle gear system 8 of the motor vehicle drive axle 3, the driven shafts 11 and 13 are coaxial and together define a wheel axis 30. Similarly, the electric machine 2, the drive shaft 9, the planetary stage 14 and the two output shafts 10 and 11 are coaxial along an axis 31, the axis 31 lying under the wheel axis 30 in a vertical direction. Consequently, the motor vehicle drive axle 3 is designed the manner of a portal axle in which a vehicle body of the motor vehicle is at a lower level at least in the region of the motor vehicle drive axle 3. In addition, the planetary stage 14 is arranged axially essentially symmetrically between the two mounting interfaces 17 and 18 of the driven shafts 11 and 13, the planetary stage 14 being positioned axially between the intermediate transmissions 15 and 16. While the intermediate transmission 15 is arranged axially close to the driving wheel 6, the intermediate transmission 16 is positioned axially close to the driving wheel 7.

FIG. 2 shows a schematic view of an electric axle drive 32 which has a motor vehicle drive axle 33 according to a second example design option of the invention. This motor vehicle drive axle 33 essentially corresponds to the preceding example variant according to FIG. 1, with the difference that, in an axle gear system 34, the axis 31 now lies above the wheel axis 30 in the vertical direction. Therefore, the motor vehicle drive axle 33 is also designed in the manner of a portal axle and, as a result, a higher ground clearance is now achievable due to the axis 31 being at a higher level. For the rest, the example design option according to FIG. 2 corresponds to the example variant according to FIG. 1, and therefore reference is made to the description thereof.

Figure 3:
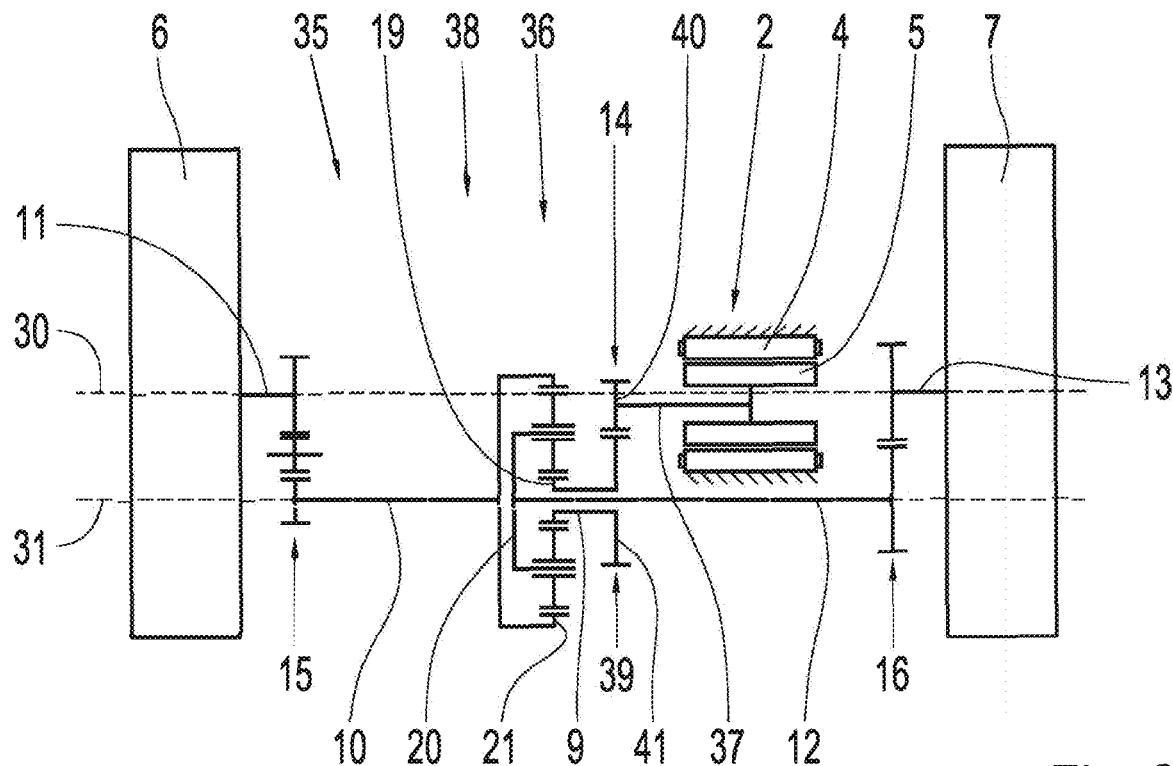
FIG. 3 shows a schematic view of an electric axle drive having a motor vehicle drive axle according to a third example embodiment of the invention.

FIG. 3 shows a schematic view of an electric axle drive 35 in which a motor vehicle drive axle 36 according to a third example embodiment of the invention is provided. This example embodiment also essentially corresponds to the example variant according to FIG. 1. In contrast thereto, the rotor 5 of the electric machine 2 is not permanently connected to the drive shaft 9 for conjoint rotation, but rather is connected to a connection shaft 37 for conjoint rotation. This connection shaft 37 is arranged within an axle gear system 38 so as to be axially offset to the axis 31 and thus also to the drive shaft 9, the connection shaft 37 being coupled to the drive shaft 9 via a spur gear stage 39. The spur gear stage 39 is composed of a spur gear 40 and a spur gear 41. The spur gear 40 is mounted on the connection shaft 37 in a rotationally fixed manner and the spur gear 41 is mounted on the drive shaft 9 in a rotationally fixed manner. The two spur gears 40 and 41 are permanently intermeshed. Via the spur gear stage 39, a pre-ratio of a drive motion, which is generated via the electric machine 2, onto the drive shaft 9 is achieved. For the rest, the example embodiment according to FIG. 3 corresponds to the example variant according to FIG. 1, and so reference is made to the description thereof.

Figure 4:
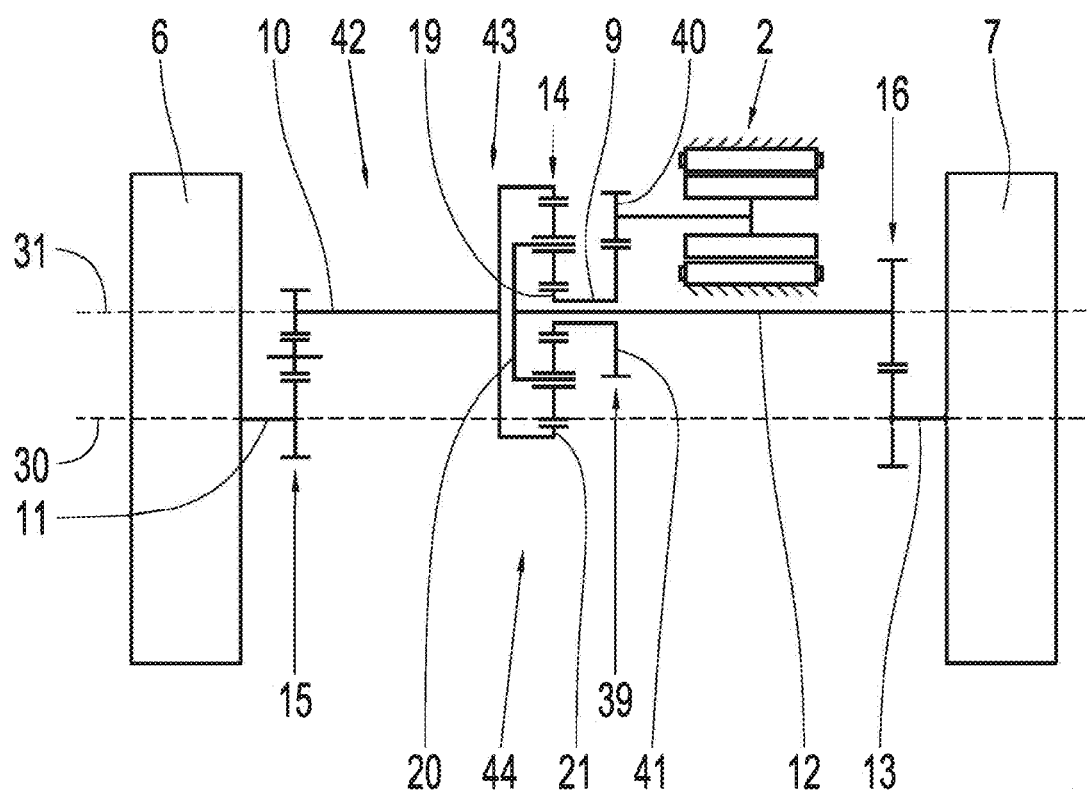
FIG. 4 shows a schematic view of an electric axle drive having a motor vehicle drive axle according to a fourth example design option of the invention.

FIG. 4 shows a schematic view of an electric axle drive 42 having a motor vehicle drive axle 43 according to a fourth example design option of the invention. This example design option largely corresponds to the preceding example variant according to FIG. 3, with the difference that, in an axle gear system 44, the axis 31 now lies above the wheel axis 30 in the vertical direction. Therefore, the motor vehicle drive axle 43 is also designed in the manner of a portal axle and, as a result, a higher ground clearance is now achievable due to the axis 31 being at a higher level. For the rest, the example design option according to FIG. 4 corresponds to the example variant according to FIG. 3, and therefore reference is made to the description thereof.

Figure 5:
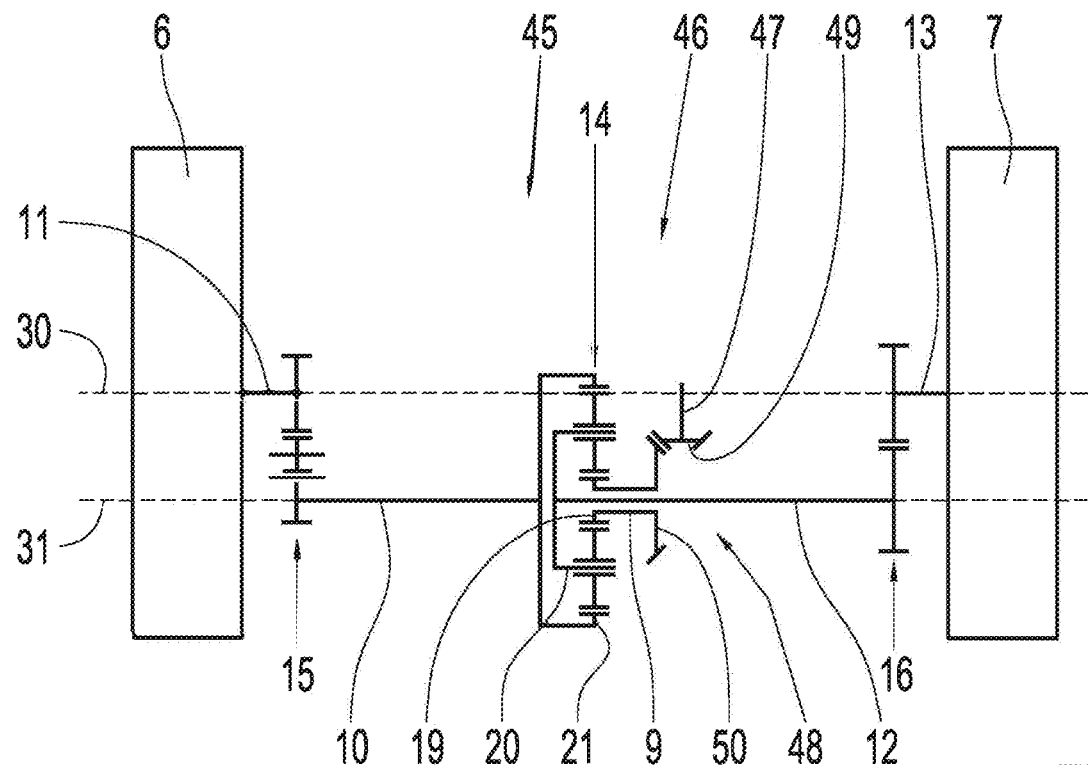
FIGS. 5 through 22 show schematic views of further example variants of a motor vehicle drive axle according to example aspects of the invention.

Furthermore, FIGS. 5 through 14 show further schematic views of motor vehicle drive axles according to example aspects of the invention, each of which can be used in an electric axle drive of an electric vehicle. FIG. 5 shows a schematic view of a motor vehicle drive axle 45 according to example aspects of the invention, which has an axle gear system 46 and essentially corresponds to the motor vehicle drive axle 3 shown in FIG. 1. The difference here is that a drive shaft 9 of the axle gear system 46 is not provided for a direct corotational connection to a drive, but rather a drive-side connection to a connection shaft 47 is to be established. This connection shaft 47, which is oriented vertically, is orthogonal to the drive shaft 9. A coupling between the connection shaft 47 and the drive shaft 9 is established via a bevel gear stage 48, which is composed of bevel gears 49 and 50. Of these permanently intermeshed bevel gears 49 and 50, the bevel gear 49 is non-rotatably positioned on the connection shaft 47, while the bevel gear 50 is non-rotatably mounted on the drive shaft 9. For the rest, the example embodiment according to FIG. 5 corresponds to the example variant according to FIG. 1, and so reference is made to the description thereof.

Figure 6:
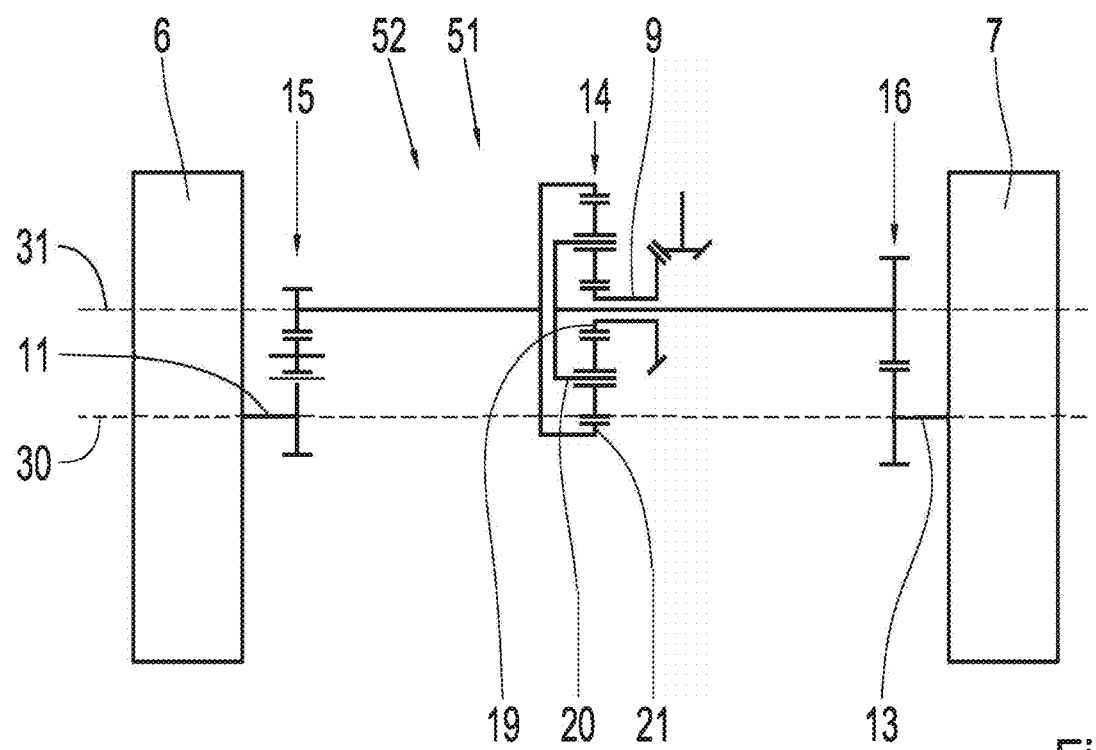

The example embodiment of a motor vehicle drive axle 51 shown in FIG. 6 largely corresponds to the preceding example variant according to FIG. 5. The example embodiment according to FIG. 6 differs from the example variant according to FIG. 5 in that, in an axle gear system 52, the axle 31 now lies above the wheel axis 30 in the vertical direction. Therefore, the motor vehicle drive axle 51 is also designed in the manner of a portal axle and, as a result, a higher ground clearance is now achievable due to the axis 31 being at a higher level. For the rest, the example design option according to FIG. 6 corresponds to the example variant according to FIG. 5, and therefore reference is made to the description thereof.

Figure 7:
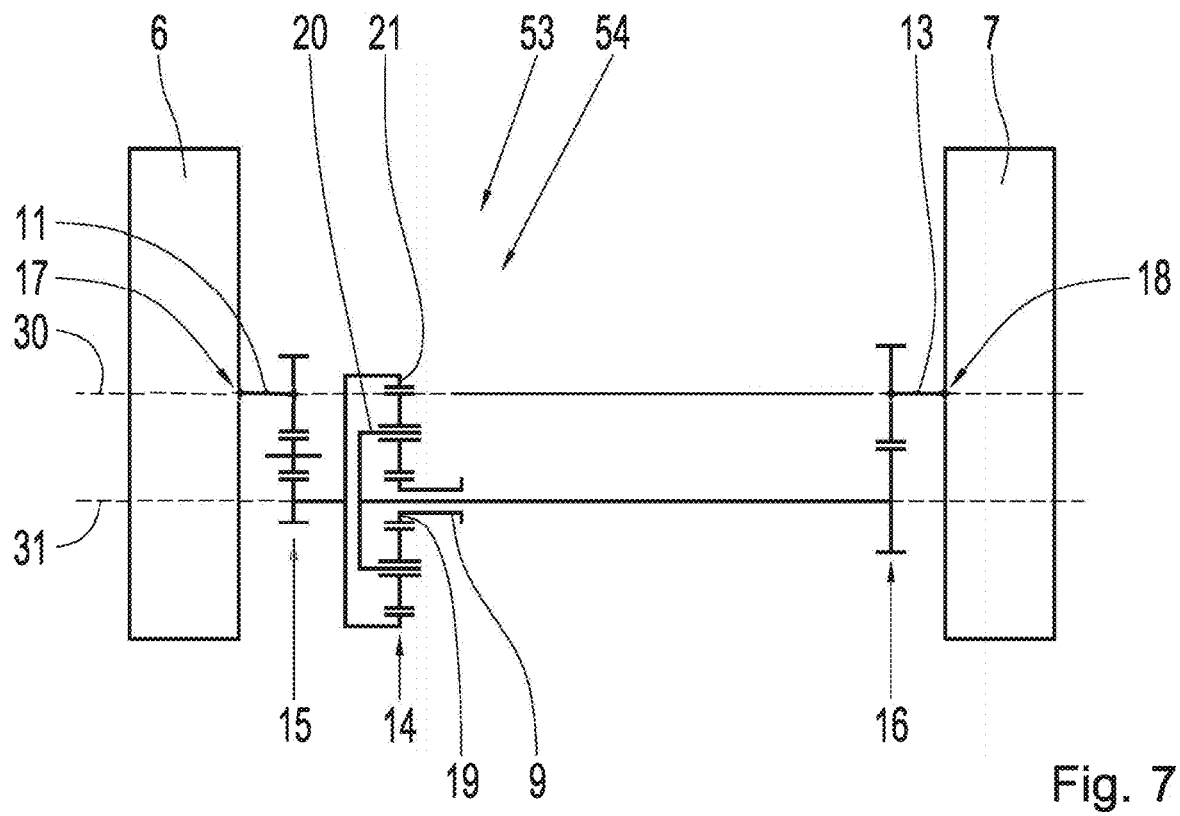

Furthermore, FIG. 7 shows a schematic view of a motor vehicle drive axle 53 having an axle gear system 54, this motor vehicle drive axle 53 essentially corresponding to the example variant according to FIG. 1. The difference is that the planetary stage 14 is now no longer positioned symmetrically between the mounting interfaces 17 and 18 of the driven shafts 11 and 13, but rather is offset towards the mounting interface 17 of the driven shaft 11. For the rest, the example embodiment according to FIG. 7 corresponds to the example variant according to FIG. 1, and therefore reference is made to the description thereof.

Figure 8:
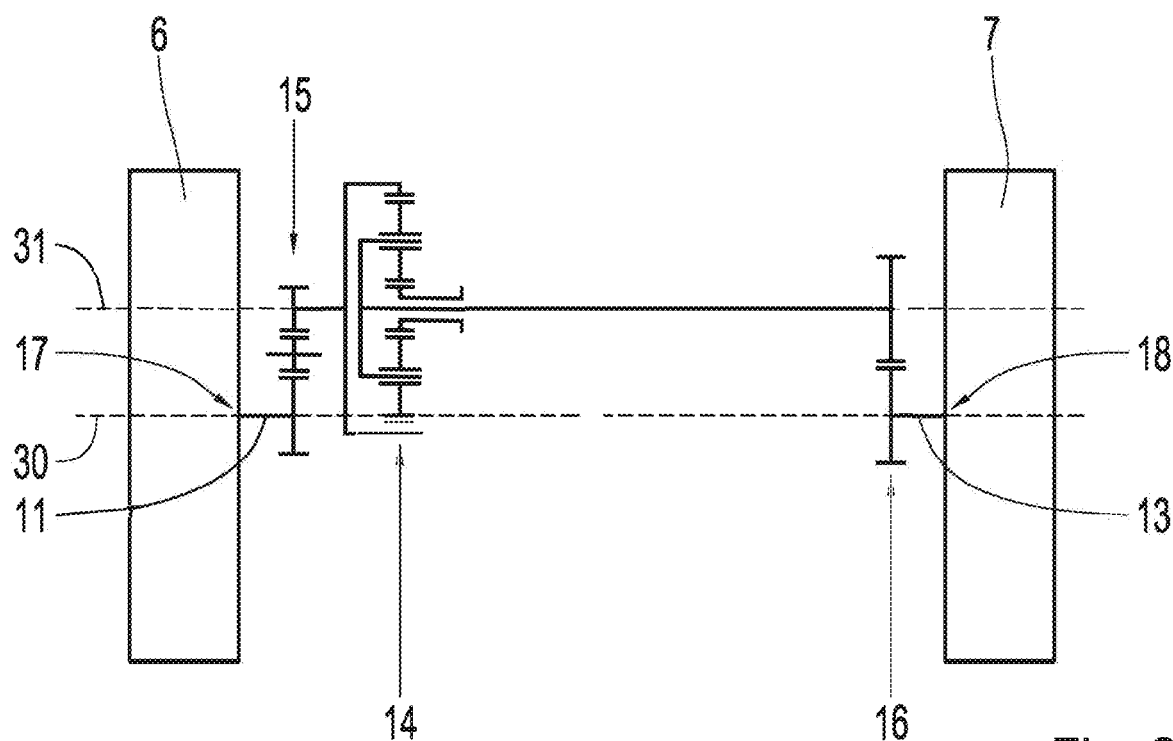

In the following example variant according to FIG. 8 as well, the planetary stage 14 is axially offset towards the mounting interface 17 of the driven shaft 11. In addition, in the motor vehicle drive axle 55 shown in FIG. 8, the axis 31 in the axle gear system 56 is arranged above the wheel axis 30 in the vertical direction. As a result, the motor vehicle drive axle 55 is designed in the manner of a portal axle. In addition, a higher ground clearance is now achievable due to the axis 31 being at a higher level. For the rest, the example design option according to FIG. 8 corresponds to the example variant according to FIG. 1, and therefore reference is made to the description thereof.

Figure 9:
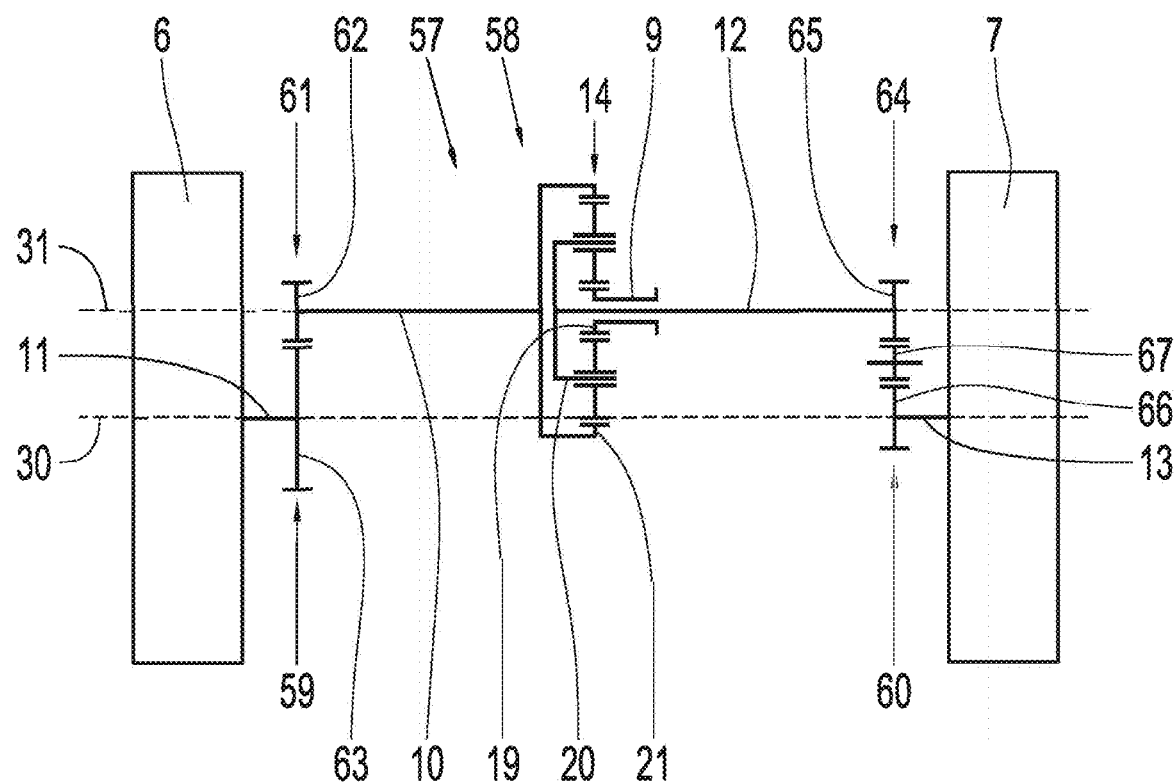

FIG. 9 shows a motor vehicle drive axle 57 according to a further example embodiment according to the invention, this motor vehicle drive axle 57 having an axle gear system 58. The motor vehicle drive axle 57 and the axle gear system 58 essentially correspond to the example variant according to FIG. 2. In contrast thereto, intermediate transmissions 59 and 60 in the axle gear system 58 are designed differently. The intermediate transmission 59 is formed by a spur gear stage 61, which is composed of two spur gears 62 and 63. While the spur gear 62 is non-rotatably positioned on the output shaft 10, the spur gear 63 meshing therewith is non-rotatably mounted on the driven shaft 11.

The intermediate transmission 60 is also formed by a spur gear stage 64, which also has, in addition to two spur gears 65 and 66, an intermediate gear 67. Of the spur gears 65 and 66, the spur gear 65 is non-rotatably positioned on the output shaft 12 and meshes with the intermediate gear 67, which is additionally meshed with the spur gear 66. The spur gear 66 is non-rotatably mounted on the driven shaft 13. Consequently, in contrast to the example variant according to FIG. 2, in the intermediate transmission 60 positioned between the output shaft 12 and the driven shaft 13, one more tooth engagement is achieved in comparison to the intermediate transmission 59 provided between the output shaft 10 and the driven shaft 11. With respect to the transmission ratios, however, the intermediate transmissions 59 and 60 are again coordinated such that an overall symmetrical distribution from the drive shaft 9 onto the driven shafts 11 and 13 is obtained.

Similarly to the example variant according to FIG. 2, the axis 31 is arranged above the wheel axis 30 in the vertical direction, as a result of which a higher ground clearance is achievable with the motor vehicle drive axle 57 due to the axis 31 being at a higher level. For the rest, the example design option according to FIG. 9 corresponds to the example variant according to FIG. 2, and therefore reference is made to the description thereof.

Figure 10:
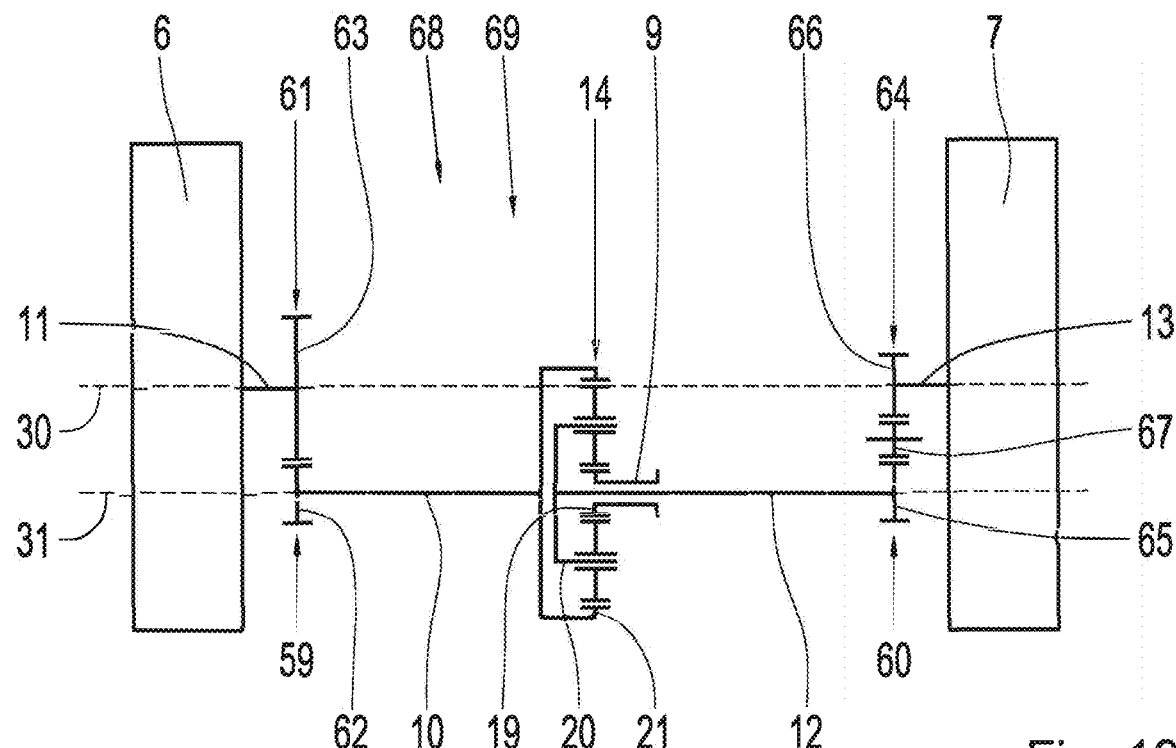

The example embodiment of a motor vehicle drive axle 68 shown in FIG. 10 largely corresponds to the preceding example variant according to FIG. 9. In an axle gear system 69 of this motor vehicle drive axle 68, similarly to the example variant according to FIG. 1, the axis 31 is now at a lower level than the wheel axis 30. For the rest, the example variant according to FIG. 10 corresponds to the example embodiment according to FIG. 9, and therefore reference is made to the description thereof.

Figure 11:
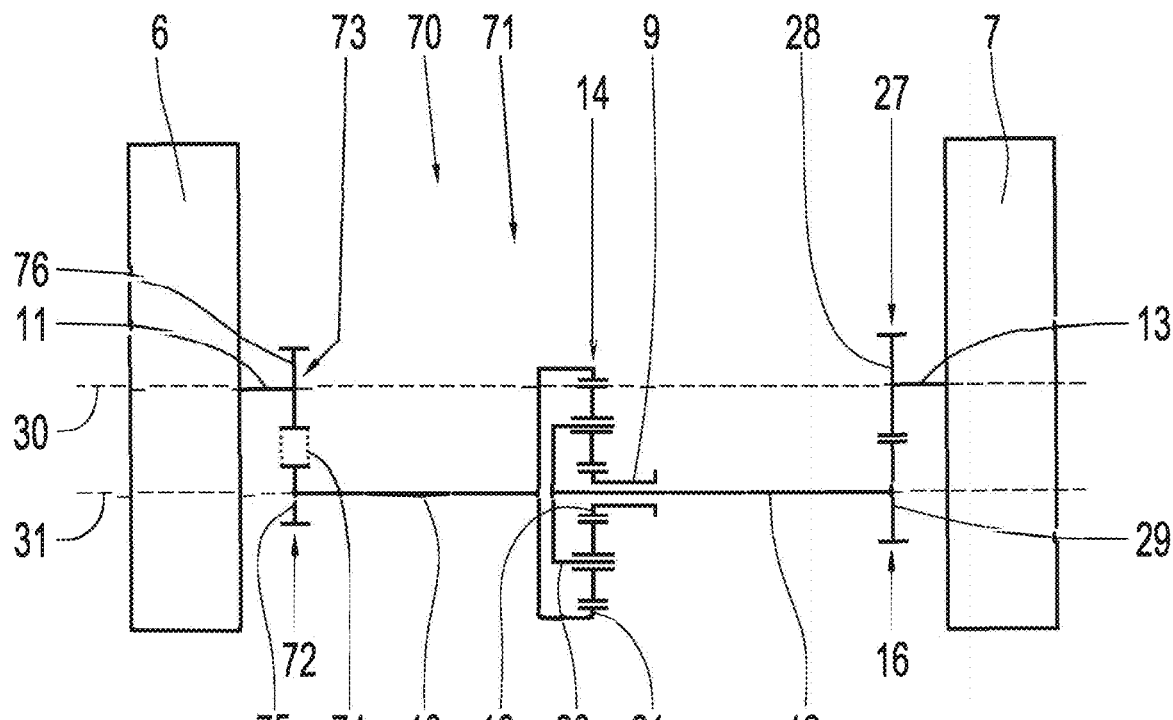

Furthermore, FIG. 11 shows a schematic view of a motor vehicle drive axle 70 which largely corresponds to the example variant according to FIG. 1. In contrast to the motor vehicle drive axle 3 shown in FIG. 1, an axle gear system 71 of the motor vehicle drive axle 70 has, in addition to the intermediate transmission 16, an intermediate transmission 72 which is formed by a flexible traction drive mechanism 73. The flexible traction drive mechanism 73 has a traction mechanism 74 in the form of a chain which couples two traction pulleys 75 and 76 to each other. While the traction pulley 75 is connected to the output shaft 10 for conjoint rotation, the traction pulley 76 is connected to the driven shaft 11 for conjoint rotation. The two traction pulleys 75 and 76 have a certain size ratio with respect to each other and, as a result, define a transmission ratio between the output shaft 10 and the driven shaft 11. Once again, the transmission ratios of the intermediate transmissions 16 and 72 are coordinated such that, proceeding from the drive shaft 9, a symmetrical torque distribution onto the driven shafts 11 and 13 is obtained in combination with identical directions of rotation. For the rest, the example embodiment according to FIG. 11 corresponds to the example variant according to FIG. 1, and therefore reference is made to the description thereof.

Figure 12:
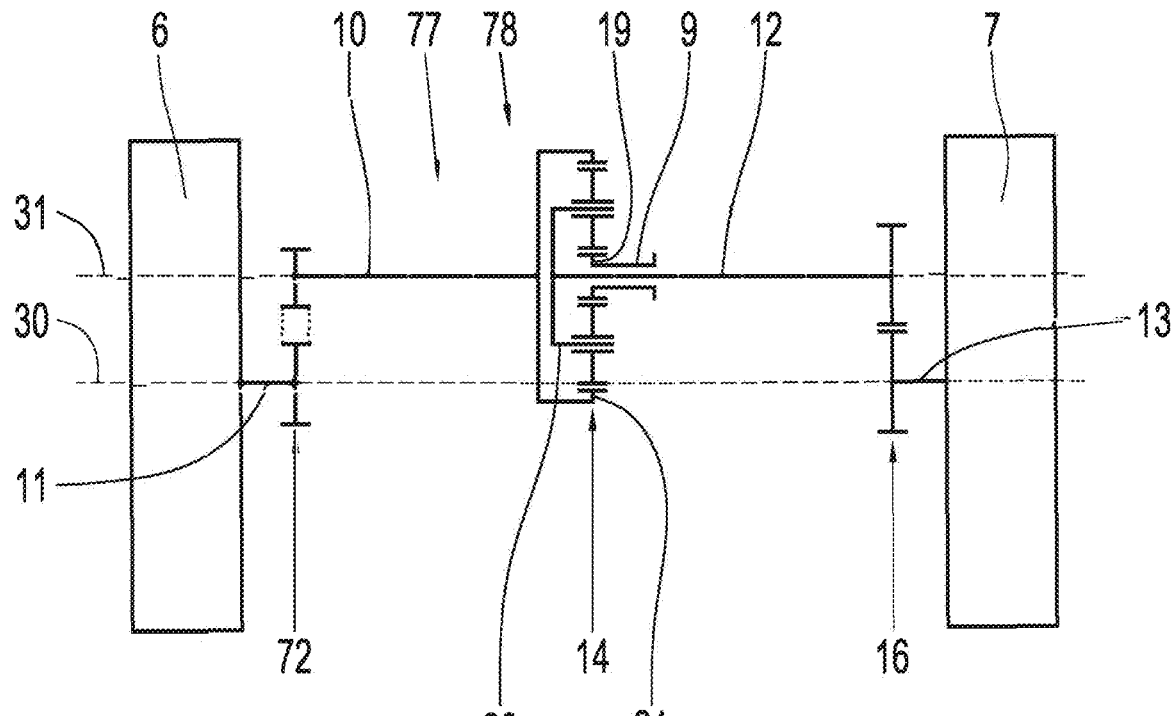

In a motor vehicle drive axle 77 according to FIG. 12, in an axle gear system 78 of the motor vehicle drive axle 77, the axis 31 is arranged above the wheel axis 30 in the vertical direction in comparison to the preceding example variant according to FIG. 11. As a result, the motor vehicle drive axle 77 is designed in the manner of a portal axle, and a higher ground clearance is achievable due to the axis 31 being at a higher level. For the rest, the example design option according to FIG. 12 corresponds to the example variant according to FIG. 11, and therefore reference is made to the description thereof.

Figure 13:
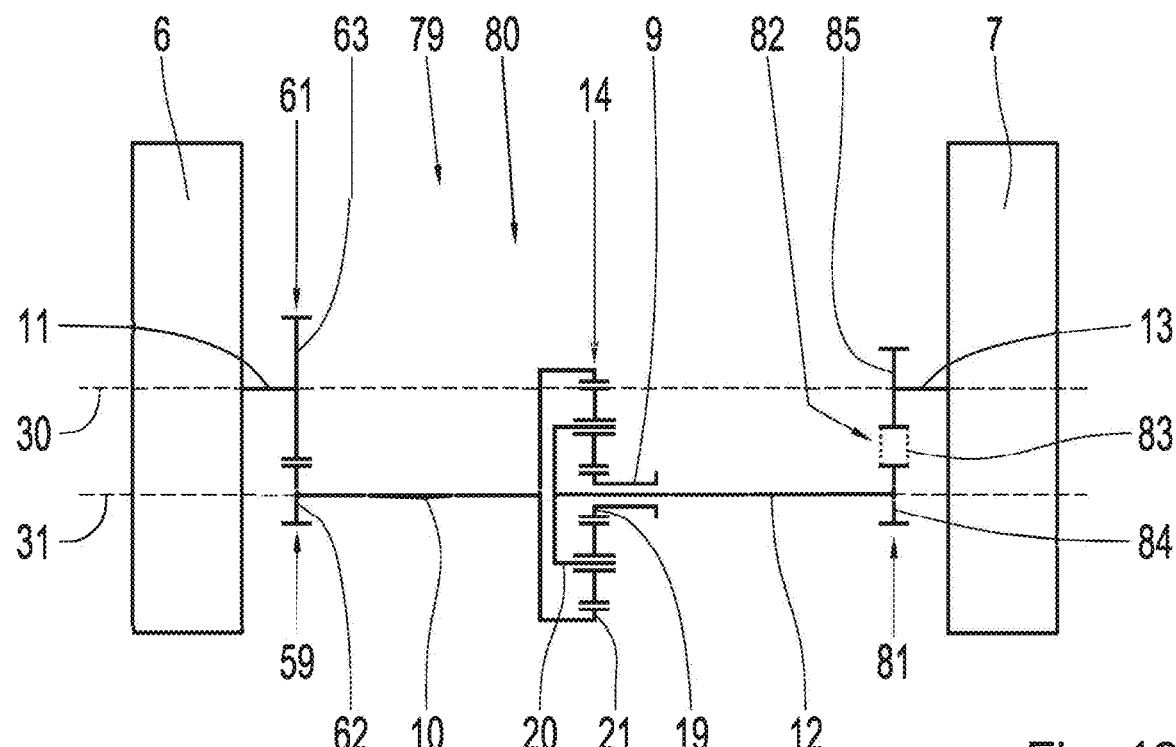

Furthermore, FIG. 13 shows a motor vehicle drive axle 79 according to a further example embodiment according to the invention, this motor vehicle drive axle 79 essentially corresponding to the motor vehicle drive axle 68 of the example variant according to FIG. 10. In contrast thereto, in an axle gear system 80 of the motor vehicle drive axle 79, in addition to the intermediate transmission 59 which couples the output shaft 10 and the driven shaft 11 to each other, an intermediate transmission 81 is provided, which is formed by a flexible traction drive mechanism 82.

This flexible traction drive mechanism 82 has, as the traction mechanism 83, a chain which couples two traction pulleys 84 and 85 to each other within the flexible traction drive mechanism 82. While the traction pulley 84 is connected to the output shaft 12 for conjoint rotation, the traction pulley 85 is connected to the driven shaft 13 for conjoint rotation. A transmission ratio of the intermediate transmission 81 is defined by a size ratio of the traction pulleys 84 and 85 with respect to each other. Once again, the transmission ratios of the intermediate transmissions 59 and 81 are coordinated such that, proceeding from the drive shaft 9, a symmetrical torque distribution onto the driven shafts 11 and 13 is obtained in combination with identical directions of rotation. For the rest, the example embodiment according to FIG. 13 corresponds to the example variant according to FIG. 10, and so reference is made to the description thereof.

Figure 14:
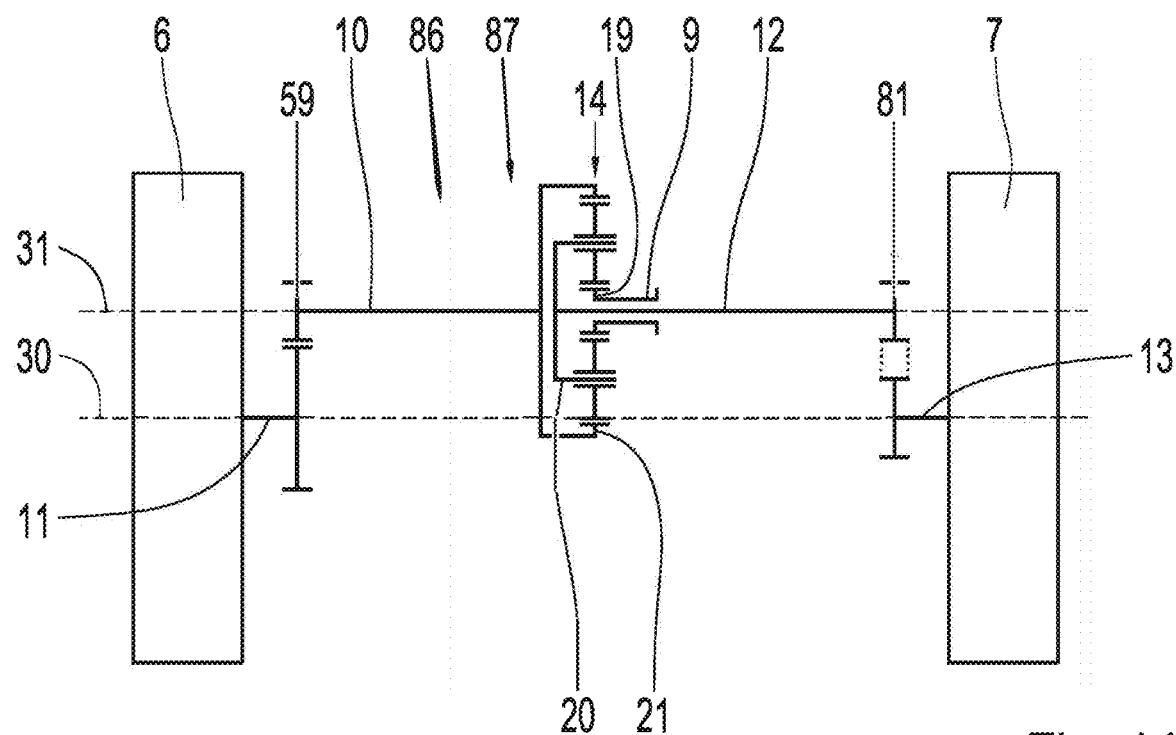

FIG. 14 shows a schematic view of a motor vehicle drive axle 86 having an axle gear system 87. The example embodiment of the motor vehicle drive axle 86 shown in FIG. 14 largely corresponds to the preceding example variant according to FIG. 13. The example embodiment according to FIG. 14 differs from the example variant according to FIG. 13 in that, in an axle gear system 87, the axis 31 now lies above the wheel axis 30 in the vertical direction. Therefore, the motor vehicle drive axle 86 is also designed in the manner of a portal axle, and a higher ground clearance is achievable due to the axis 31 being at a higher level. For the rest, the example design option according to FIG. 14 corresponds to the example variant according to FIG. 13, and therefore reference is made to the description thereof.

In the example variants according to FIGS. 5 and 6 as well as FIGS. 9 through 14, a modification also can be achieved in which the planetary stage 14 is axially offset towards the mounting interface of the driven shaft 11 or 13.

Furthermore, FIGS. 15 through 22 show further example variants according to the invention of a respective motor vehicle drive axle 88, 89, 90, 91, 92, 93, 94, 95. In these example variants, in a respective axle gear system 96, 97, 98, 99, 100, 101, 102, 103 of the respective motor vehicle drive axle 88, 89, 90, 91, 92, 93, 94, 95, the respective intermediate transmissions 15 and 16, 59 and 60, 16 and 72, 59 and 81 are arranged axially directly next to one another, such that the respective one intermediate transmission 15, 16, 59, 60, 72, 81 is situated axially between the respective other intermediate transmission 15, 16, 59, 60, 72, 81 and the planetary stage 14.

Figure 15:
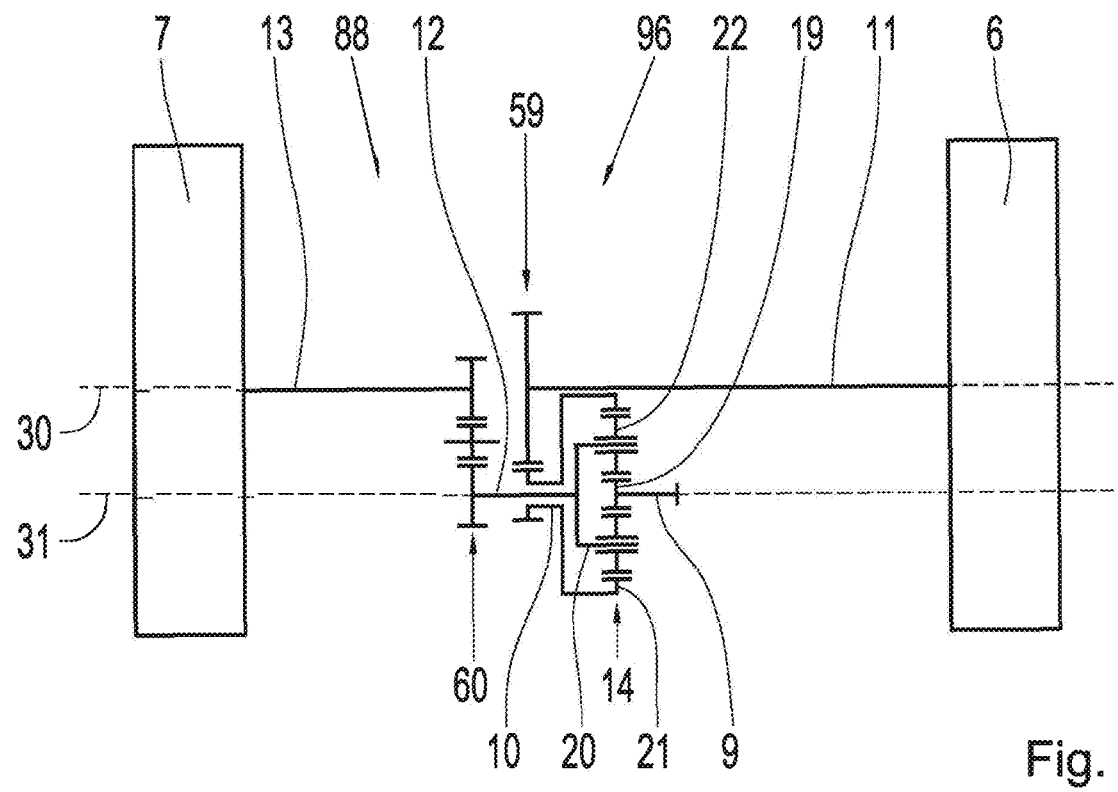
Figure 16:
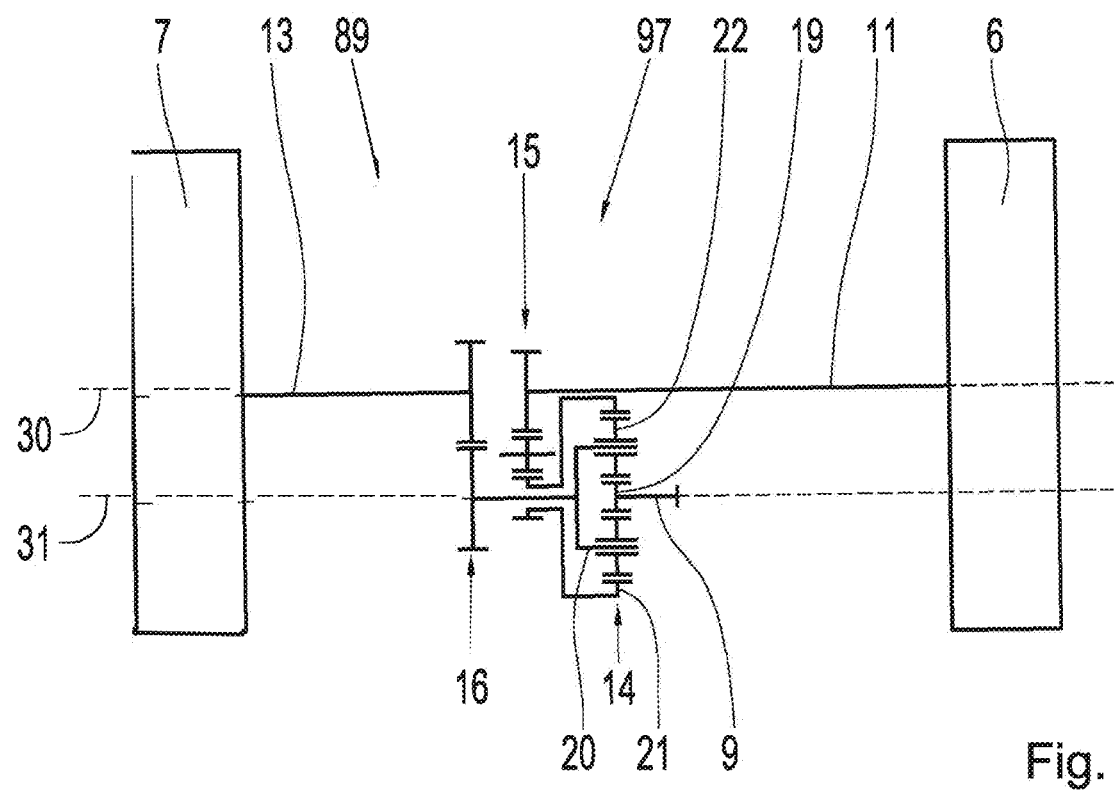
Figure 17:
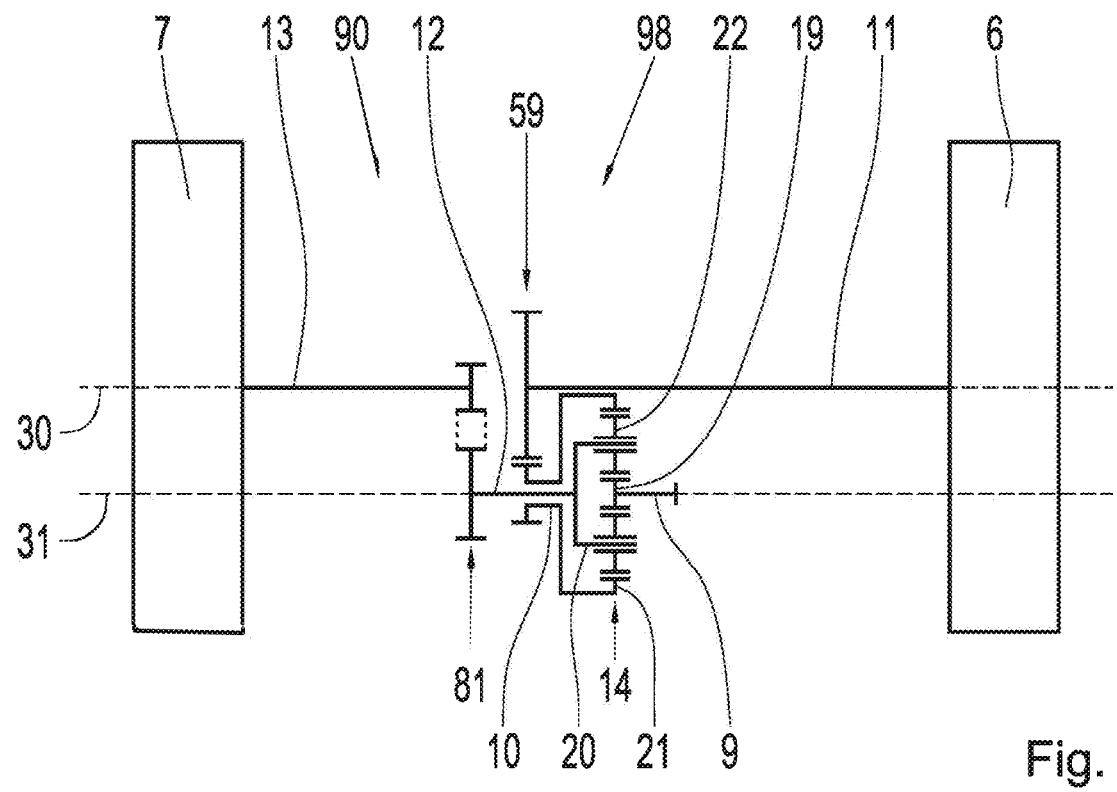
Figure 18:
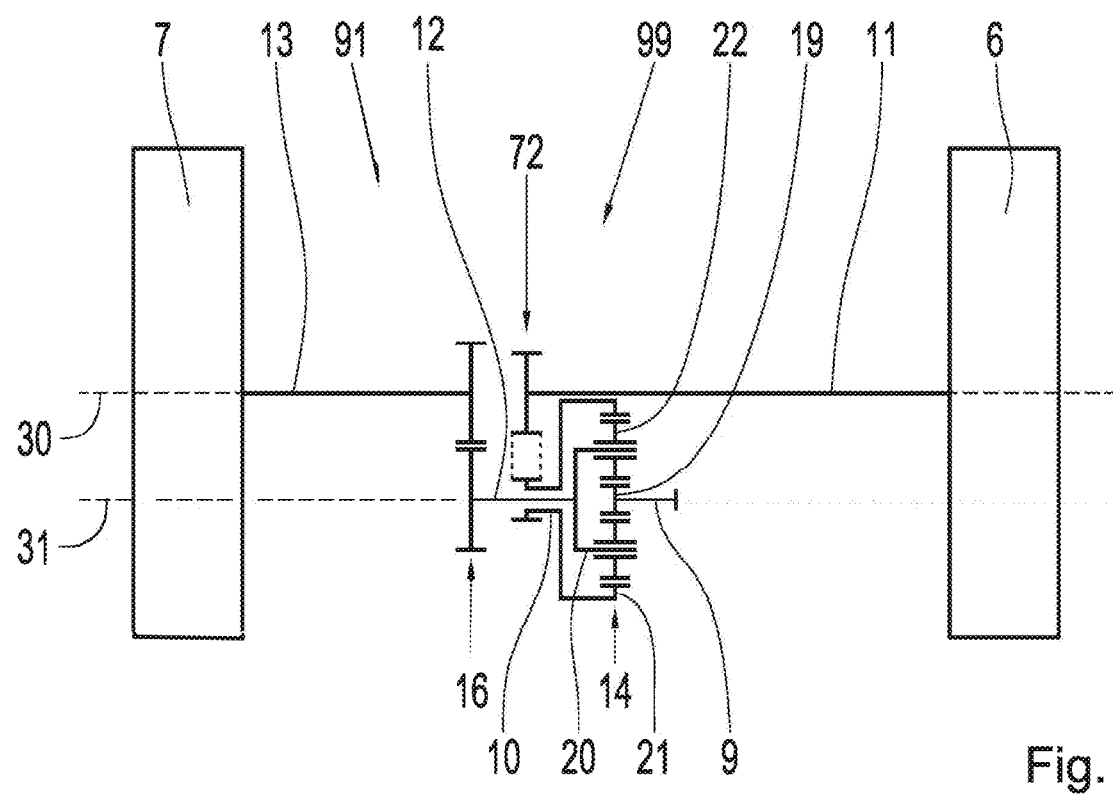
Figure 19:
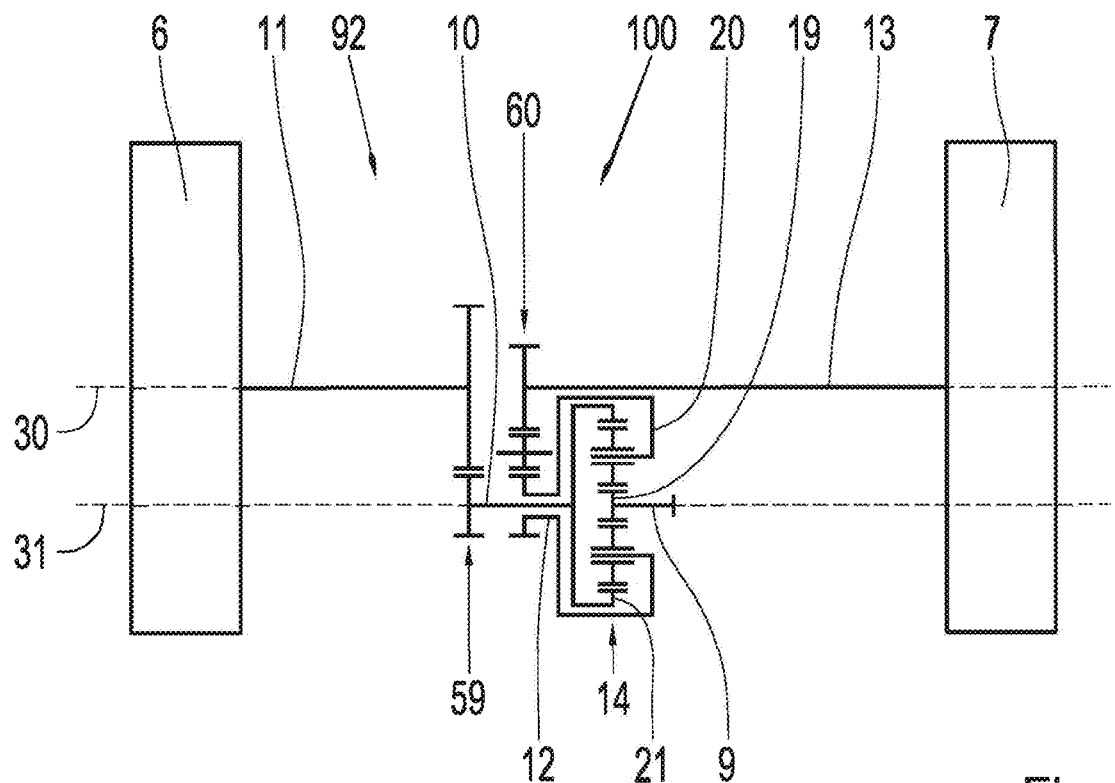
Figure 20:
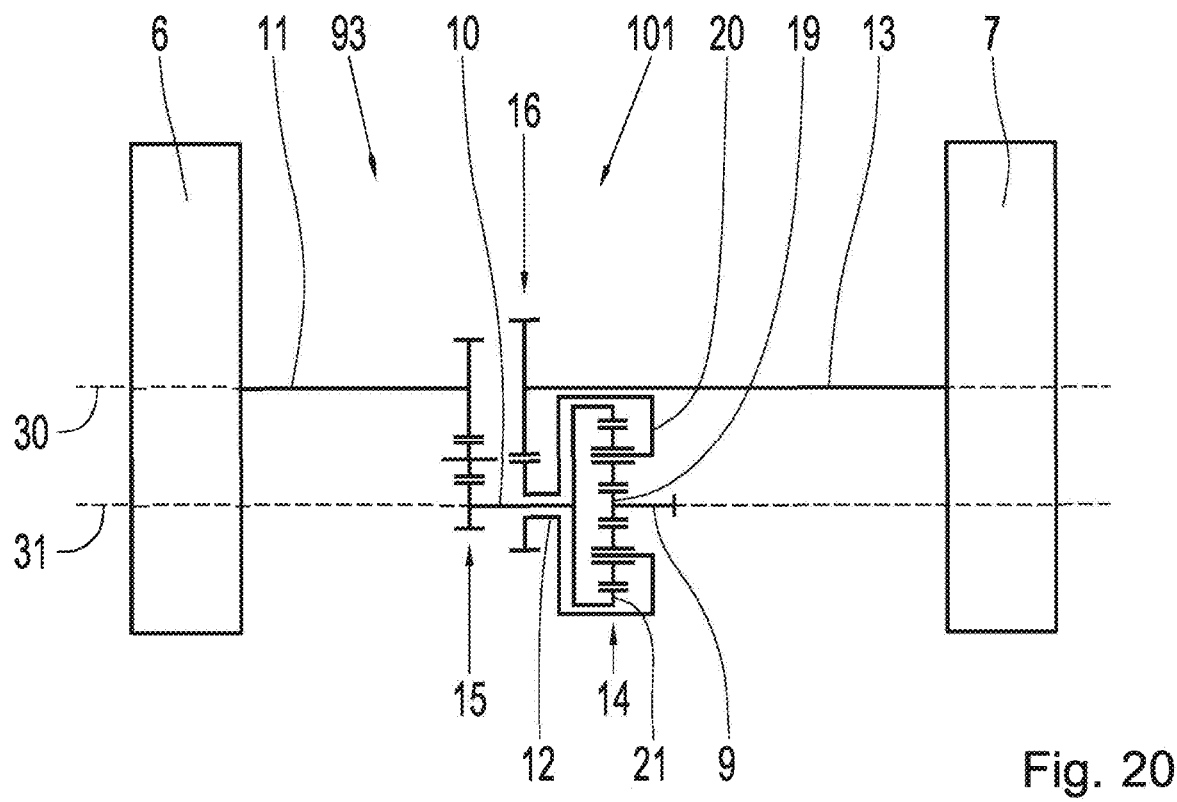
Figure 21:
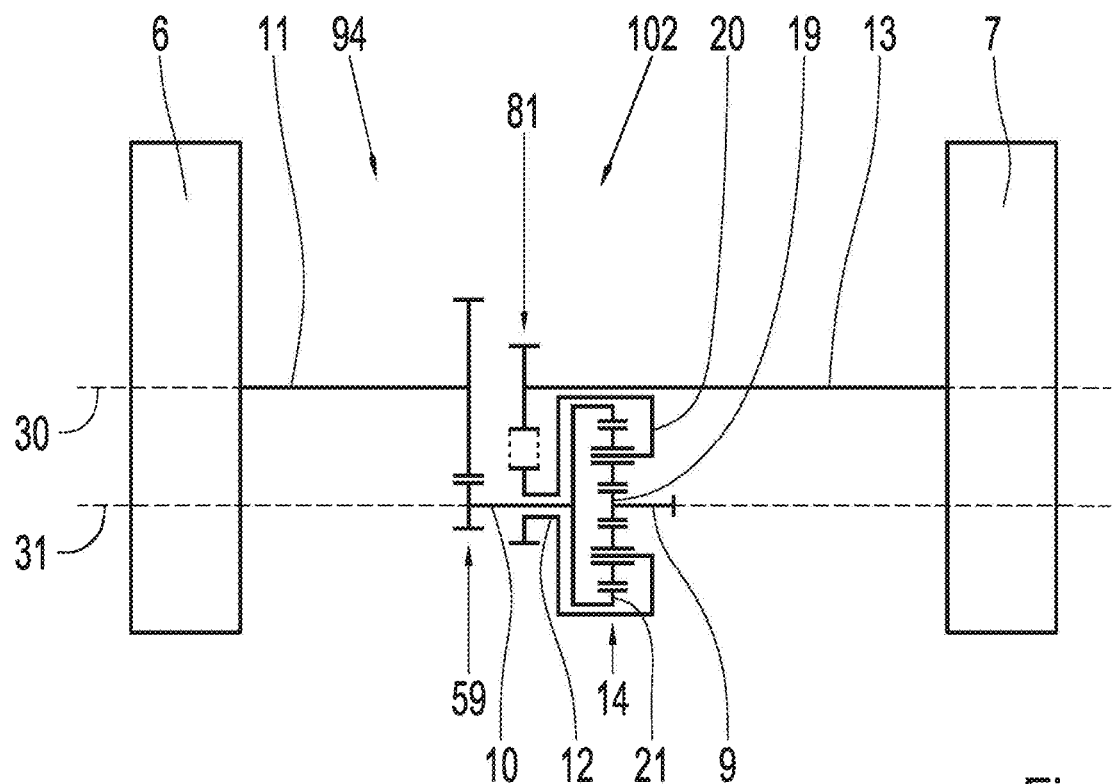
Figure 22:
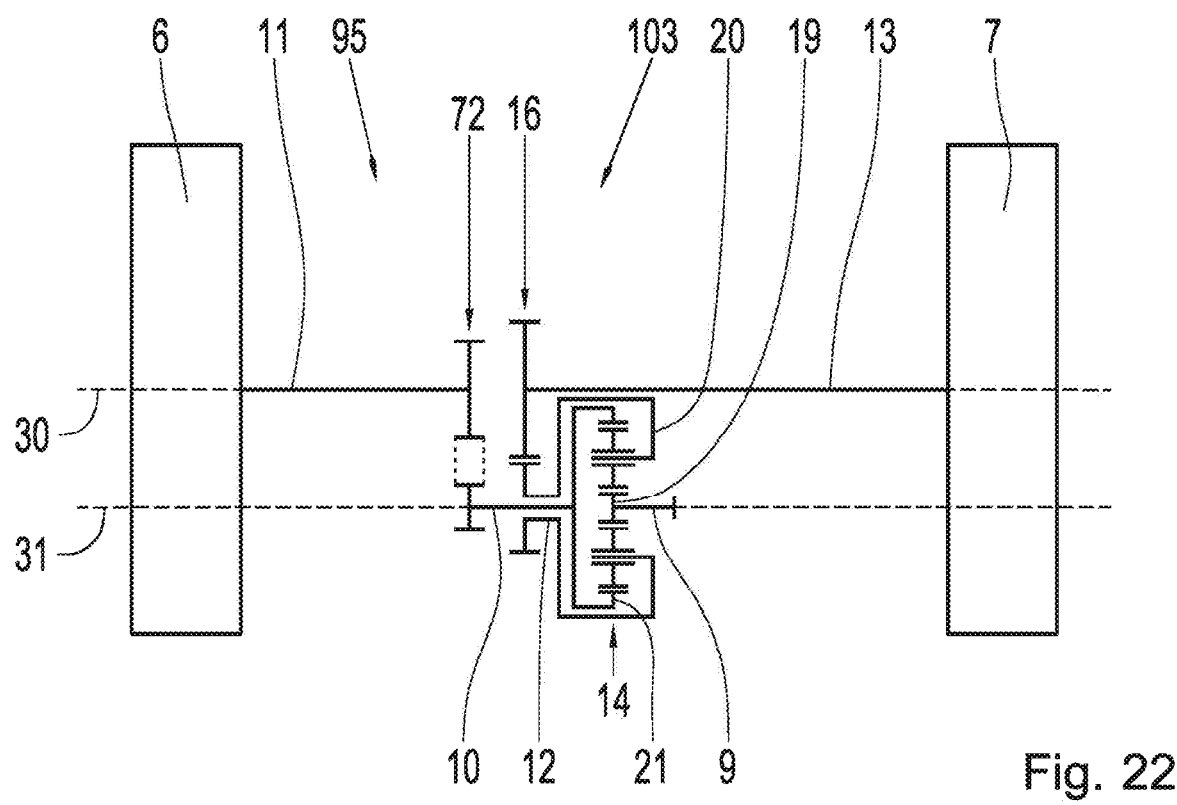

The example variant according to FIG. 15 corresponds, for the rest, to the example embodiment according to FIG. 10. The example variant according to FIG. 16 corresponds, for the rest, to the example embodiment according to FIG. 1. The example variant according to FIG. 17 corresponds, for the rest, to the example embodiment according to FIG. 13. The example variant according to FIG. 18 corresponds, for the rest, to the example embodiment according to FIG. 11. The example variant according to FIG. 19 corresponds, for the rest, to the example embodiment according to FIG. 10. The example variant according to FIG. 20 corresponds, for the rest, to the example embodiment according to FIG. 1. The example variant according to FIG. 21 corresponds, for the rest, to the example embodiment according to FIG. 13 and the example variant according to FIG. 22 corresponds, for the rest, to the example embodiment according to FIG. 11. In the example variants according to FIGS. 15 through 22, a modification can also be achieved in which the axis 31 is offset to the wheel axis 30 upwards in the vertical direction.

In all aforementioned example variants, in addition, an offset of the axis 31 to the wheel axis 30 can also be implemented, as an alternative to or in addition to an offset in the vertical direction, in the direction of travel, i.e., in the longitudinal direction of the motor vehicle, as a result of which the axis 31 is situated either upstream or downstream from the wheel axis 30 in the longitudinal direction.

By the example embodiments of an axle gear system according to example aspects of the invention, a compact motor vehicle drive axle having a high transmission ratio can be obtained.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 electric axle drive
2 electric machine
3 motor vehicle drive axle
4 stator
5 rotor
6 driving wheel
7 driving wheel
8 axle gear system
9 drive shaft
10 output shaft
11 driven shaft
12 output shaft
13 driven shaft
14 planetary stage
15 intermediate transmission
16 intermediate transmission
17 mounting interface
18 mounting interface
19 sun gear
20 planet carrier
21 ring gear
22 planet gears
23 spur gear stage
24 spur gear
25 spur gear
26 intermediate gear
27 spur gear stage
28 spur gear
29 spur gear
30 wheel axis
31 axis
32 electric axle drive
33 motor vehicle drive axle
34 axle gear system
35 electric axle drive
36 motor vehicle drive axle
37 connection shaft
38 axle gear system
39 spur gear stage
40 spur gear
41 spur gear
42 electric axle drive
43 motor vehicle drive axle
44 axle gear system
45 motor vehicle drive axle
46 axle gear system
47 connection shaft
48 bevel gear stage
49 bevel gear
50 bevel gear
51 motor vehicle drive axle
52 axle gear system
53 motor vehicle drive axle
54 axle gear system
55 motor vehicle drive axle
56 axle gear system
57 motor vehicle drive axle
58 axle gear system
59 intermediate transmission
60 intermediate transmission
61 spur gear stage
62 spur gear
63 spur gear
64 spur gear stage
65 spur gear
66 spur gear
67 intermediate gear
68 motor vehicle drive axle
69 axle gear system
70 motor vehicle drive axle
71 axle gear system
72 intermediate transmission
73 flexible traction drive mechanism
74 traction mechanism
75 traction pulley
76 traction pulley
77 motor vehicle drive axle
78 axle gear system
79 motor vehicle drive axle
80 axle gear system
81 intermediate transmission
82 flexible traction drive mechanism
83 traction mechanism
84 traction pulley
85 traction pulley
86 motor vehicle drive axle
87 axle gear system
88 motor vehicle drive axle
89 motor vehicle drive axle
90 motor vehicle drive axle
91 motor vehicle drive axle
92 motor vehicle drive axle
93 motor vehicle drive axle
94 motor vehicle drive axle
95 motor vehicle drive axle
96 axle gear system
97 axle gear system
98 axle gear system
99 axle gear system
100 axle gear system
101 axle gear system
102 axle gear system
103 axle gear system

The invention claimed is:

1. An axle gear system (71; 78; 80; 87; 98; 99; 102; 103) for a motor vehicle drive axle (70; 77; 79; 86; 90; 91; 94; 95), comprising:
   a planetary stage (14) comprising a sun gear (19), a ring gear (21), and a planet carrier (20) in which at least one planet gear (22) is rotatably mounted, the at least one planet gear (22) meshed with both the sun gear (19) and the ring gear (21), the planetary stage (14) having a fixed carrier train ratio of less than negative one;
   a first driven shaft (13) and a second driven shaft (11) configured for connection to driving wheels (6, 7) of the motor vehicle drive axle (70; 77; 79; 86; 90; 91; 94; 95); and
   a drive shaft (9) configured for a coupling to a drive,
   wherein the sun gear (19) of the planetary stage (14) is connected to the drive shaft (9) for conjoint rotation,
   wherein the planet carrier (20) is connected to a first output shaft (12) for conjoint rotation, and the first output shaft (12) is coupled to the first driven shaft (13) via a first intermediate transmission (16; 81),
   wherein the ring gear (21) is connected to a second output shaft (10) for conjoint rotation, and the second output shaft (10) is coupled to the second driven shaft (11) via a second intermediate transmission (59; 72),
   wherein the transmission ratios of the first and second intermediate transmissions (72, 16; 59, 81) are coordinated such that, in combination with the fixed carrier train ratio of the planetary stage (14), a symmetrical torque distribution from the drive shaft (9) onto the first and second driven shafts (11, 13) is established,
   wherein one of the first and second intermediate transmissions (72; 81) is configured to bring about identical directions of rotation for the respective pair of the first and second output shafts and the first and second driven shafts,
   wherein the other of the first and second intermediate transmissions (72; 81) is configured to bring about opposite directions of rotation for the respective pair of the first and second output shafts and the first and second driven shafts,
   wherein the one of the first and second intermediate transmissions (72; 81) comprises a flexible traction drive mechanism (73; 82) with a traction mechanism (74; 83) coupling two traction pulleys (75, 76; 84, 85) to each other, one of the traction pulleys (75; 84) is non-rotatably positioned on the respective one of the first and second output shafts (10; 12) associated with the one of the first and second intermediate transmissions (16; 59), and the other of the traction pulleys (76; 85) is non-rotatably positioned on the respective one of the first and second driven shafts (11; 13) associated with the one of the first and second intermediate transmissions (72; 81), and
   wherein the other of the first and second intermediate transmissions (16; 59) comprises two intermeshed spur gears (28, 29; 62, 63), one of the two intermeshed spur gears (29; 62) is non-rotatably positioned on the respective one of the first and second output shafts (12; 10) associated with the other of the first and second intermediate transmissions (16; 59), and the other of the two intermeshed spur gears (29; 62) is non-rotatably positioned on the respective one of the first and second driven shafts (13; 11) associated with the other of the first and second intermediate transmissions (16; 59).

2. The axle gear system (71; 78; 80; 87; 98; 99; 102; 103) of claim 1, wherein the planetary stage (14) is disposed axially equidistant to mounting interfaces (17, 18) of the driven shafts (11, 13) for the driving wheels (6, 7) or is axially offset towards one (17) of the mounting interfaces (17, 18).

3. The axle gear system (71; 78; 80; 87; 98; 99; 102; 103) of claim 1, wherein:
   the first and second driven shafts (11, 13) are disposed coaxial; and
   the drive shaft (9) is disposed vertically offset to a wheel axis (30) formed by the coaxial first and second driven shafts (11, 13).

4. The axle gear system of claim 1, wherein:
   the first and second driven shafts (11, 13) are disposed coaxial; and
   the drive shaft (9) is disposed transversely offset to a wheel axis formed by the coaxial first and second driven shafts (11, 13) along a direction of travel.

5. The axle gear system (38; 44; 46; 52) of claim 1, wherein the drive shaft (9) is coupled via at least one gear stage to a connection shaft (37; 47) that is configured for connection to the drive.

6. The axle gear system (46; 52) of claim 5, wherein the at least one gear stage comprises a bevel gear stage (48) with a first bevel gear (50) intermeshed with a second bevel gear (49), the first bevel gear (50) coupled to the drive shaft (9), the second bevel gear (49) coupled to the connection shaft (47).

7. The axle gear system (38; 44) of claim 5, wherein the at least one gear stage comprises a spur gear stage (39) with a first spur gear (41) intermeshed with a second spur gear (40), the first spur gear (41) coupled to the drive shaft (9), the second spur gear (40) coupled to the connection shaft (37).

8. The axle gear system (71; 78; 80; 87; 98; 99; 102; 103) of claim 1, wherein the planetary stage (14) is arranged axially between the first and second intermediate transmissions (15, 16; 59, 60; 72, 16; 59, 81) or the intermediate transmissions (15, 16; 59, 60; 72, 16; 59, 81) are positioned axially directly next to each other.

9. A motor vehicle drive axle (70; 77; 79; 86; 90; 91; 94; 95), comprising the axle gear system (71; 78; 80; 87; 98; 99; 102; 103) of claim 1, wherein at least one perspective driving wheel (6, 7) is connected to each of the first driven shaft (13) and the second driven shaft (11).

10. An electric axle drive (1; 32; 35; 42) for an electric vehicle, comprising:
    an electric machine (2); and
    the motor vehicle drive axle (3; 33; 36; 43) of claim 9,
    wherein a rotor (5) of the electric machine (2) is coupled to the drive shaft (9) of the axle gear system (8; 34; 38; 44).

11. The electric axle drive (1; 32) of claim 10, wherein the electric machine (2) is disposed coaxial to the drive shaft (9) of the axle gear system (8; 34).

12. The electric axle drive (35; 42) of claim 10, wherein the electric machine (2) is disposed axially offset to the drive shaft (9) of the axle gear system (38; 44.

13. An axle gear system (96; 97; 98; 99; 100; 101; 102; 103) for a motor vehicle drive axle (88; 89; 90; 91; 92; 93; 94; 95), comprising:
    a planetary stage (14) comprising a sun gear (19), a ring gear (21), and a planet carrier (20) in which at least one planet gear (22) is rotatably mounted, the at least one planet gear (22) meshed with both the sun gear (19) and the ring gear (21), the planetary stage (14) having a fixed carrier train ratio of less than negative one;

a first driven shaft (13) and a second driven shaft (11) configured for connection to driving wheels (6, 7) of the motor vehicle drive axle (88; 89; 90; 91; 92; 93; 94; 95); and a drive shaft (9) configured for a coupling to a drive, wherein the sun gear (19) of the planetary stage (14) is connected to the drive shaft (9) for conjoint rotation, wherein the planet carrier (20) is connected to a first output shaft (12) for conjoint rotation, and the first output shaft (12) is coupled to the first driven shaft (13) via a first intermediate transmission (16; 60; 81), wherein the ring gear (21) is connected to a second output shaft (10) for conjoint rotation, and the second output shaft (10) is coupled to the second driven shaft (11) via a second intermediate transmission (15; 59; 72), wherein the transmission ratios of the first and second intermediate transmissions (16; 60; 81, 15; 59; 72) are coordinated such that, in combination with the fixed carrier train ratio of the planetary stage (14), a symmetrical torque distribution from the drive shaft (9) onto the first and second driven shafts (11, 13) is established, and wherein the intermediate transmissions (16; 60; 81, 15; 59; 72) are positioned axially directly next to each other.

14. The axle gear system (96; 97; 98; 99; 100; 101; 102; 103) of claim 13, wherein:

one of the first and second intermediate transmissions (15; 60; 16; 59) is configured to bring about identical directions of rotation for the respective pair of the first and second output shafts and the first and second driven shafts; and the other of the first and second intermediate transmissions (15; 60; 16; 59) is configured to bring about opposite directions of rotation for the respective pair of the first and second output shafts and the first and second driven shafts.

15. The axle gear system (96; 97; 100; 101) of claim 14, wherein:

the one of the first and second intermediate transmissions (15; 60; 16; 59) comprises a second spur gear stage (23; 64) that includes two spur gears (24, 25; 65, 66) meshed with an intermediate gear (26; 67), one of the two spur gears (24; 65) is non-rotatably positioned on the respective one of the first and second output shafts (10; 12) associated with the one of the first and second intermediate transmissions (15; 60; 16; 59), and the other of the two spur gears (24; 65. is non-rotatably positioned on the respective one of the first and second driven shafts (11; 13. associated with the one of the first and second intermediate transmissions (15; 60; 16; 59); and the other of the first and second intermediate transmissions (15; 60; 16; 59) comprises two intermeshed spur gears (28, 29; 62, 63), one of the two intermeshed spur gears (29; 62) is non-rotatably positioned on the respective one of the first and second output shafts (12; 10) associated with the other of the first and second intermediate transmissions (15; 60; 16; 59), and the other of the two intermeshed spur gears (29; 62) is non-rotatably positioned on the respective one of the first and second driven shafts (13; 11) associated with the other of the first and second intermediate transmissions (15; 60; 16; 59).

16. The axle gear system (98; 99; 102; 103) of claim 14, wherein:

the one of the first and second intermediate transmissions (15; 60; 16; 59) comprises a flexible traction drive mechanism (73; 82) with a traction mechanism (74; 83) coupling two traction pulleys (75, 76; 84, 85) to each other, one of the traction pulleys (75; 84) is non-rotatably positioned on the respective one of the first and second output shafts (10; 12) associated with the one of the first and second intermediate transmissions (15; 60; 16; 59), and the other of the traction pulleys (76; 85) is non-rotatably positioned on the respective one of the first and second driven shafts (11; 13) associated with the one of the first and second intermediate transmissions (15; 60; 16; 59); and the other of the first and second intermediate transmissions (15; 60; 16; 59) comprises two intermeshed spur gears (28, 29; 62, 63), one of the two intermeshed spur gears (29; 62) is non-rotatably positioned on the respective one of the first and second output shafts (12; 10) associated with the other of the first and second intermediate transmissions (15; 60; 16; 59), and the other of the two intermeshed spur gears (29; 62) is non-rotatably positioned on the respective one of the first and second driven shafts (13; 11) associated with the other of the first and second intermediate transmissions (15; 60; 16; 59).

17. The axle gear system (96; 97; 98; 99; 100; 101; 102; 103) of claim 13, wherein the planetary stage (14) is disposed axially equidistant to mounting interfaces (17, 18) of the driven shafts (11, 13) for the driving wheels (6, 7) or is axially offset towards one (17) of the mounting interfaces (17, 18).

18. The axle gear system (96; 97; 98; 99; 100; 101; 102; 103) of claim 13, wherein:

the first and second driven shafts (11, 13) are disposed coaxial; and the drive shaft (9) is disposed vertically offset to a wheel axis (30) formed by the coaxial first and second driven shafts (11, 13).

19. The axle gear system of claim 13, wherein:

the first and second driven shafts (11, 13) are disposed coaxial; and the drive shaft (9) is disposed transversely offset to a wheel axis formed by the coaxial first and second driven shafts (11, 13) along a direction of travel.

20. The axle gear system of claim 13, wherein the drive shaft (9) is coupled via at least one gear stage to a connection shaft (37; 47) that is configured for connection to the drive.

* * * * *